INVENTOR.
G. C. CADWELL
BY
George E. Pearson
ATTORNEY

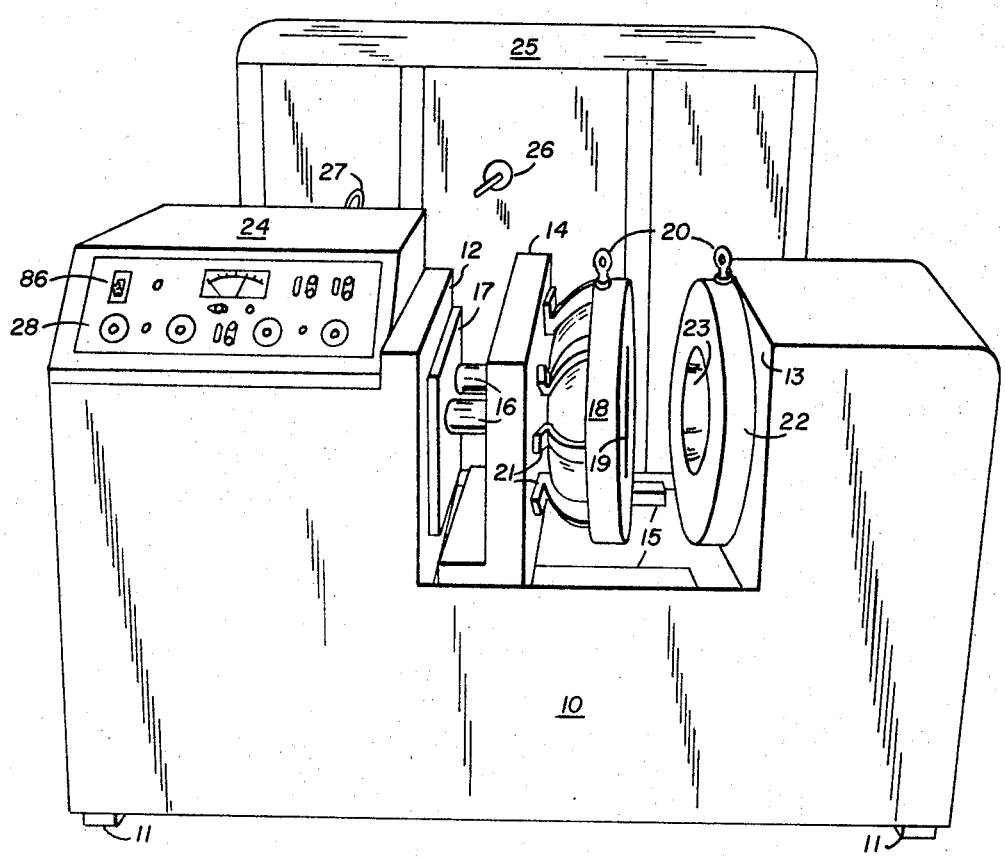
FIG. 1
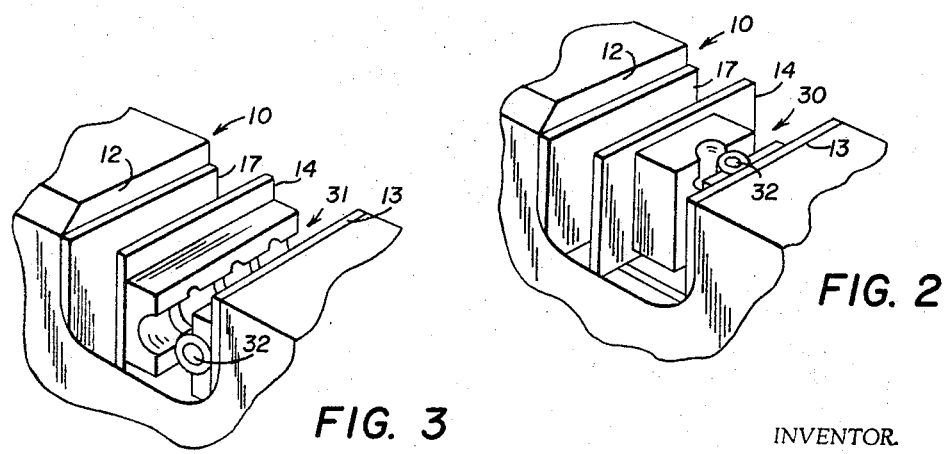
FIG. 3
FIG. 2
INVENTOR.
G. C. CADWELL
BY
George E. Pearson
ATTORNEY July 1, 1969          G. C. CADWELL          3,452,565
ELECTRIC DISCHARGE MACHINE AND METHOD OF METAL FORMING
Filed Nov. 23, 1964          Sheet 2 of 9

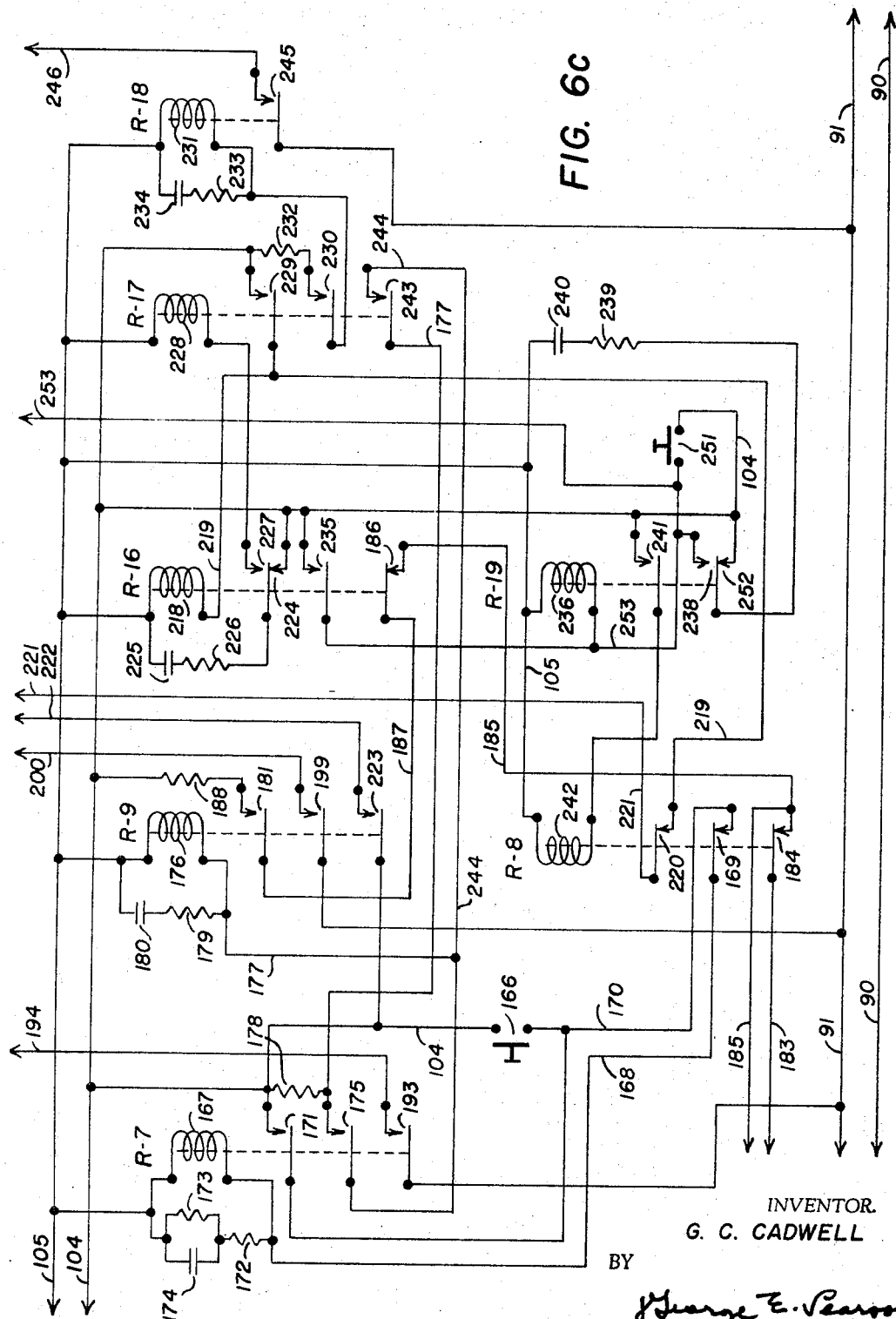

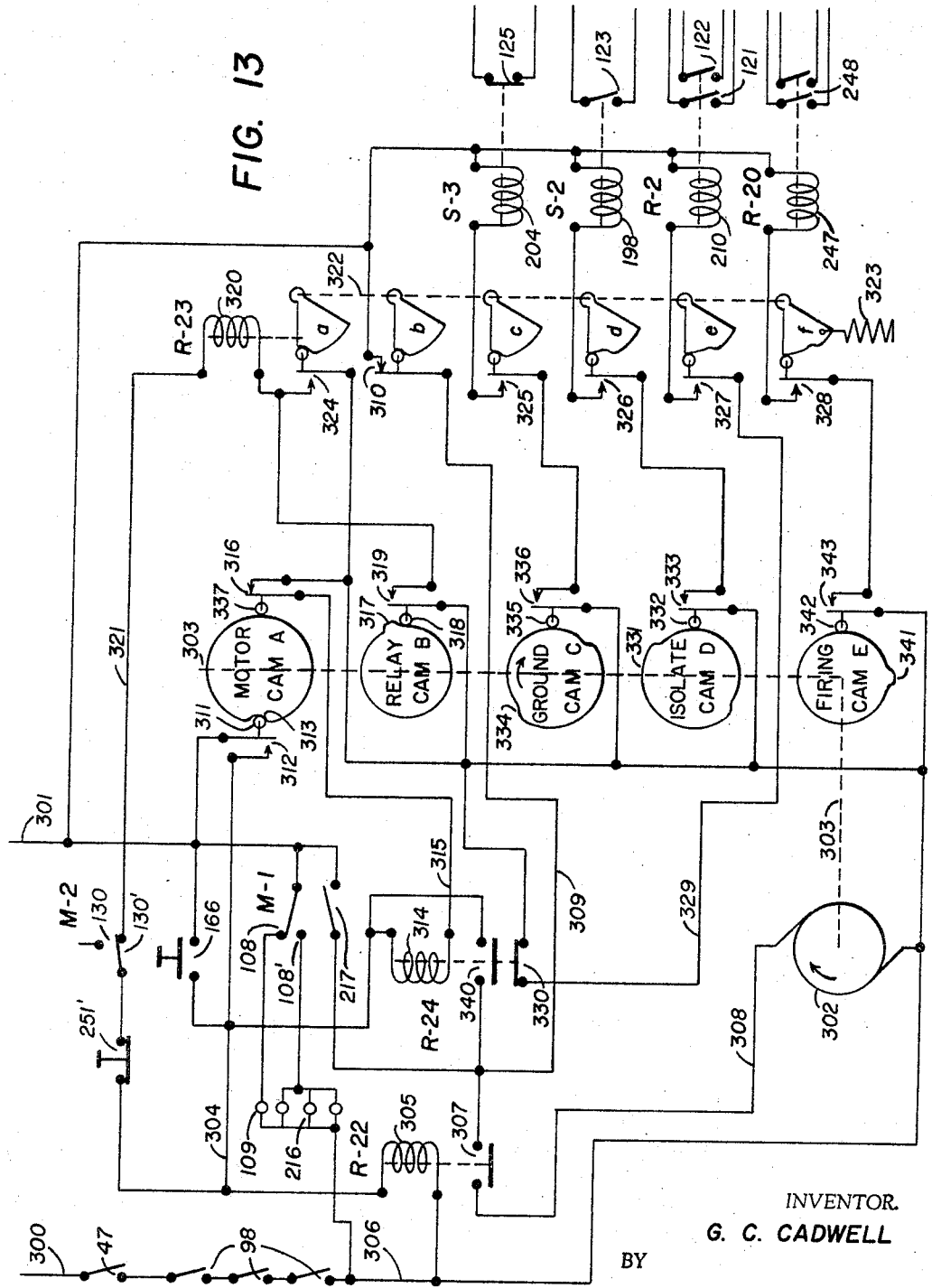

United States Patent Office 3,452,565
Patented July 1, 1969

3,452,565
ELECTRIC DISCHARGE MACHINE AND
METHOD OF METAL FORMING
Gilbert C. Cadwell, Lakeside, Calif., assignor to
Rohr Corporation, a corporation of California
Filed Nov. 23, 1964, Ser. No. 413,081
Int. Cl. B21d 26/14
U.S. Cl. 72—56                                  14 Claims

ABSTRACT OF THE DISCLOSURE

Apparatus for forming metals by electric discharge in electroconductive water (tap water) includes vacuum die and spark gap transducer structures which engage under pressure to clamp and seal a workpiece therebetween and respectively provide vacuum and water filled cavities on opposite sides of the workpiece. The body of water in the transducer cavity provides the shock wave generating and transfer medium and empties by gravity when the formed part is removed from the die. The transducer cavity is filled from the bottom to thus force all entrapped air outwardly through a restricted water flow escape port at the top of the cavity. Shock waves for forming the workpiece are generated in the water medium by discharge of capacitively stored energy within the water and across the transducer discharge gap. The voltage level desired for charge and discharge of the bank is pre-set on a second voltmeter type relay which follows the rise in voltage on the bank as the same charges, this relay having switch means which become actuated when the voltage on the bank reaches the level pre-set on the relay. Actuation of the switch means at the desired voltage level causes sequential opening of the charging circuit to terminate the charge, disconnection of the bank from the charging circuit to isolate the power supply, the closing of a vacuum type discharge switch to transfer the charge to the discharge gap, and the closing of the grounding switch to dump any residual charge to ground. Sequentially operated time delayed relays, or alternatively, a cyclically operable multi-cam motor actuator are employed to effect the charge and discharge cycle of operations.

Background of the invention

This invention relates generally to the forming of metal parts such as flat blanks, tubes, cones and the like, and more particularly to the forming of such parts to the configuration of a confronting die face by high velocity shock wave forces generated through the discharge of electrical energy in a body of water which serves as the medium for transferring the shock waves to the metal part to be formed.

The present invention is an improvement in the method and apparatus disclosed and claimed in the copending application of Louis R. Padberg, Jr., for Electrical Discharge Method of and Apparatus for Generating Shock Waves in Water, Ser. No. 43,580, filed July 18, 1960 by the assignee of the instant application.

In accordance with the method and apparatus of the copending application aforesaid, electrical energy upwards of 100 watt-seconds is capacitively stored at voltage levels upwards of 1,000 volts and discharged at will across a virtual short circuit water path within an electrically conductive body of water. The transfer of the stored energy to the short circuited water path or gap is effected by a vacuum switch, i.e., a solenoid actuated switch having contacts which mechanically close in a vacuum. Such a switch not only affords the advantages of providing power standoff protection by reason of the vacuum gap between the switch contacts when the same are open and providing for energy transfer through the contacts when the same are closed at will by energization of the solenoid, but the series connected water gap and closed switch contacts present such a low impedance discharge path to the stored energy as to cause the same to be discharged so rapidly as to generate high velocity shock waves within the water.

The body of water is enclosed, in part, by a transducer whose spaced and mutually insulated electrode faces define the discharge gap within the water and, in part, by the confronting metal surface of the part to be formed against the die surface, provision being made for evacuating the die cavity between the confronting metal part and die surfaces. Thus, in response to the force of the shock waves applied thereto, the metal part is moved into conforming engagement with the configuration of the die face. The nature of this movement and engagement is such that the metal of the part to be formed virtually flows to and is coined against the die surface with machine marks, or the like, on the die being evidenced in the surface of the formed part. This is accomplished, moreover, without appreciable thinning of the metal, and there is no accompanying spring-back with such movement and engagement.

Apparatus constructed and operated in accordance with the afore-described method and arrangement of the copending application, in practice, has produced entirely satisfactory results in the production of metal parts by electric discharge. It has been found, however, that the prior art methods of energy storage and release have unnecessarily restricted operation of the apparatus to comparatively low energy and voltage levels and have unnecessarily limited the utility of the device with respect to the achievement of high scale production in use. In the prior art arrangement, for example, the energy storage bank of capacitors is charged to a desired level and held against discharge in a power standoff sense by the vacuum switch. The holding of standoff power at high energy and potential levels is not only dangerous but severely strains the dielectric properties of the capacitors and discharge switch in addition to rendering uncertain the precise power level of the electric energy which may be available at the time of release and discharge, or which inadvertently may be held in storage notwithstanding an apparent firing or complete cyclic operation of the apparatus.

Efficient transformation of the stored electrical energy into shock wave energy which performs the desired work depends in large measure on the conductivity of the water medium and the absence of air bubbles or entrapment therein. These conditions are not readily controlled, however, in the prior art arrangements wherein cyclic replacement of the reservoir or well of stored water medium is neither practical nor economically feasible and use of the same body of water with replenishment for losses necessarily results in contamination of the medium and the introduction of air bubbles as unavoidable incidents of such repeated firings and replenishment or due to immersion of the pre-formed parts and the handling of production aids within the water.

In accordance with the improvements of the present invention, the disadvantages of the prior art arrangements are largely obviated while retaining all of the advantages thereof. For example, the voltage level desired for charge and discharge of the stored energy is pre-set on a voltmeter type switch device which is connected and arranged to initiate actuation of the vacuum discharge and transfer switch when the energy being capacitively stored reaches the pre-set level. More specifically, provision is made for isolating the charging source, that is, disconnecting the charging source from both the capacitor bank and the vacuum discharge switch prior to firing, and grounding the capacitor bank following each firing of the apparatus.

Accordingly, in preparation for each firing, and in sequential order, the isolating switch is first closed, the grounding connection for the capacitor bank is next opened followed by closing of a charging switch which controls energization of the power supply, thereby to start the charge of the energy bank. Charging of the bank to the desired voltage level of upwards of 18,500 volts at 60,000 joules of energy is completed in the order of a maximum of 25 seconds, whereupon the aforesaid voltmeter switch causes the charging switch to be opened to terminate the charge, the isolation switch to be opened to isolate the power supply, the discharge switch to be closed to transfer and fire the charge, and the grounding switch to be closed to dump any residue of the charge, all in the order named. A short interval of time is required to effect the various switch actuations between operations of the voltmeter and the energy transfer switches, and this interval which is of the order of 0.15 second, is the time during which the vacuum type energy transfer switch is called upon, in a power standoff sense, to prevent premature discharge or leakage from the energy bank.

Upon actuation, as aforenoted, the transfer switch per se interposes no impedance to energy transfer therethrough, and coaxial cable means is employed to minimize the impedance of the energy transfer path between the switch and the transducer.

Provision is also made for aborting a normal firing cycle of the apparatus, that is, the apparatus is caused to complete a cycle without causing a transfer of energy to the transducer in the event of a malfunctioning of the apparatus, or when the operator, for some reason, desires to avoid a firing and to return the apparatus to its initial unoperated condition. Thus, for example, the operator may avoid a firing, that is, a transfer of energy to the transducer, by merely pressing an abort button any time before the voltage on the energy bank reaches its pre-set level. Or the normal firing cycle may be aborted automatically in the event that any one of various cabinet closures is open or only partially closed thereby to leave an associated interlock switch open, or where a predetermined hydraulic pressure fails to develop or hold in closing and locking the water cavity, or where for some reason, the charge on the capacitor bank rises above the pre-set value. In the event of any such contingencies, the energy stored, or partially stored is diverted to ground by way of the grounding switch, thereby to prevent a condition of standoff power, usually at lethal voltage and energy levels, remaining as a charge on the capacitor bank.

The present invention also makes provision for mounting of the transducer and die structures on an inverted or horizontal C-frame having hydraulic rams for opening and closing the die. In this arrangement, the die and transducer are removably mounted respectively on the upright legs of the frame and in confronting relation across the gap between the legs. The gap thus provides a convenient and accessible work area for mounting of the part in confronting relation to the die surface on the one side and to the transducer on the other. In this mounted position of the pre-formed part or blank, the same seals a transducer cavity for containing the body of water which provides the shock wave generating and transfer medium. This requires re-filling of the transducer cavity for each firing since the water empties from the cavity upon opening of the dies for removal of the formed part. Several advantages accrue from this arrangement, however, since the water not only discharges readily by gravity but fills from the bottom of the cavity forcing the air outwardly through an escape port at the top of the cavity. The flow of water, moreover, is continued through the air escape port to thus further assure that no entrapped air remains within the cavity, the port being small enough, on the other hand, to avoid any appreciable increase in the amount of water discharged therethrough at the time of firing.

*Objects*

An object of the present invention therefore is to provide new and improved methods and apparatus for forming metal parts by electrical discharge in electroconductive water.

Another object is to provide improved methods and apapratus for storing and releasing electrical energy precisely at pre-set levels with a minimum of time only being required for holding the stored energy in a standoff condition prior to release and firing.

Another object resides in the provision of push button control of the charge and discharge cycle wherein the cyclic operation normally proceeds automatically from the initiation of the charge to the discharge firing and final grounding of the energy bank.

Another object resides in the provision of means for protecting and isolating the power supply during the firing discharge of the energy bank.

Still another object is to make provision for removing any energy remaining on the energy bank following either a normally fired discharge of the energy bank or an abortive operation of the charge and discharge mechanism therefor.

A further object is to make provision for aborting the cyclic charge and discharge operation either under push button control of the operator or automatically in response to abnormal operating conditions such as over voltage, insufficient hydraulic pressure, circuit failure, and the like, or due to operator inadvertence in failing to close all interlock switches on certain power cabinet doors.

Still a further object is to provide a new and improved mounting arrangement for the cooperating die and transducer structures having provision for simplifying the mounting and removal of the same while also avoiding contamination of the water transfer medium and entrapment of air bubbles therein.

*Brief description of the drawings*

Still other objects, features and advantages of the present invention will become more fully apparent as the description proceeds, reference being had to the accompanying drawings wherein:

FIG. 1 is a view in perspective of apparatus for practicing the method of the present invention of forming metal parts by electric discharge;

FIGS. 2 and 3 are fragmentary views in perspective of the diactuator of FIG. 1 and respectively illustrating vertically and horizontally disposed die mounting arrangements for forming a tubular part;

FIGS. 6a, 6b, and 6c are diagrammatic views illustrating portions of the complete charge and discharge control circuit for the apparatus of the present invention;

FIG. 13 is a diagrammatic view of an alternative charge and discharge control system suitable for use with the apparatus of the present invention.

Specification

Figure 4:
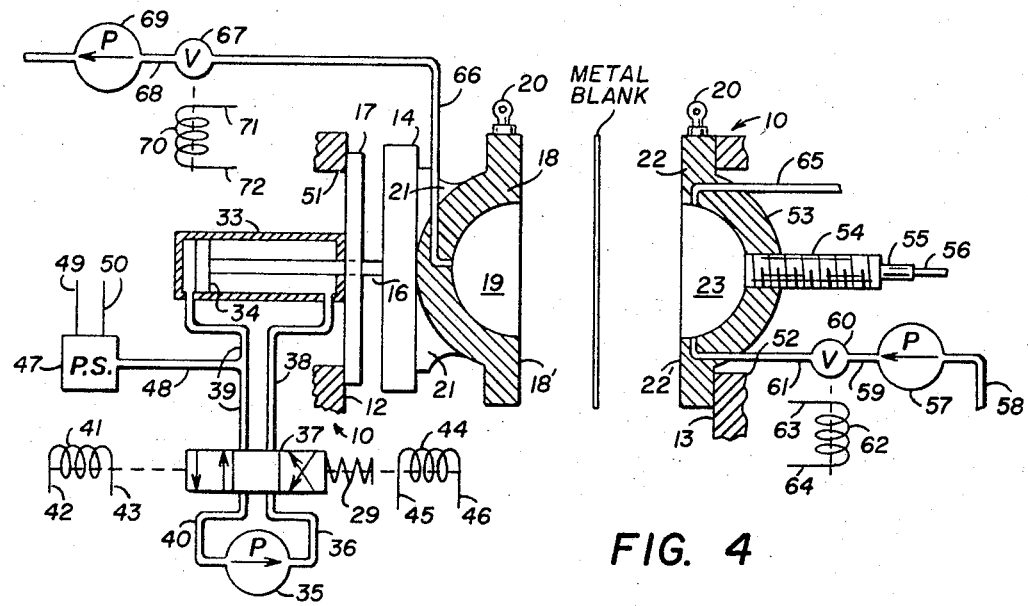
FIG. 4 is a schematic view illustrating the die and transducer structures in relation to a metal blank to be formed on the die.

Referring now to the drawings and first more particularly to FIG. 1, 10 generally designates a rigid steel C-frame which is horizontally disposed on spaced supports 11 to present vertically disposed and confronting jaw surfaces 12 and 13 which define an open and accessible work region or station where the metal forming work is done. An inverted L-shaped platen 14 is slidably mounted on frame-secured tracks 15 for movement in the space or gap between the opposed surfaces 12 and 13. For this purpose, a pair of piston rods 16 are secured to the platen and comprise parts of a hydraulic actuating unit including a plate 17 for mounting the unit on the jaw surface 12.

A die 18 having a metal forming cavity 18, here shown to be semi-spherical by way of example only, and having a lifting eye 20 is mounted on platen 14 as by suitable clamps and/or bolts (not shown) which engage certain of the die gussets 21. A matching pressure vessel 22 having a cavity 23 and a lifting eye 20 is suitably mounted as by bolts or screws (not shown) to the jaw surface 13.

Internally of the C-frame are mounted hydraulic pump, vacuum, and water systems subsequently to be described, and an electronic control panel and chassis unit 24 is mounted on top of the left end of the C-frame, as viewed in FIG. 1. The control unit as will appear more fully as the description proceeds, is electrically connected to a capacitor bank, sometimes called an energy bank, and to associated equipment housed in a cabinet 25 disposed behind the C-frame.

Cabinet 25 has a door handle operated power switch 26 and door interlock switches and warning lights subsequently to be described. Control panel unit 24 also has a power switch 27 and a panel 28 upon which are mounted and displayed various lights and controls subsequently to be described.

Referring now to FIGS. 2 and 3, there are respectively shown thereon, vertically and horizontally disposed die sets 30 and 31 for forming tubular parts, the part to be formed (not shown) being vertically positioned for forming on the machine as shown in FIG. 2 and horizontally mounted for the purpose on the machine in FIG. 3. The die sets are otherwise similarly formed with the transducer mounting opening 32 in each case being disposed at one end of the cylindrical die cavity. One half of each die set, moreover, mounts on the movable platen 14, and the other half mounts on the jaw surface 13, as aforedescribed in connection with the mounting arrangement of mating die and transducer structures 18 and 22 of FIG. 1. It will be understood that the die arrangements for forming tubular parts as in FIGS. 2 and 3 is by way of example only and that other die sets for forming parts of other configurations such as cones and the like may be used on the machine of FIG. 1.

The hydraulic system for actuating platen 14 is disclosed in FIG. 4 and comprises a pair of rams or cylinders 33, one only of which appears in FIG. 4. Each cylinder has a piston 34 secured by a rod 16 to platen 14 which thus moves in response to fluid pressure applied to the piston. A pump 35 which draws from a reservoir of oil (not shown) applies pressure via line 36 through a solenoid actuated valve 37 selectively to either of lines 38 and 39 depending on the position of the valve to the right or to the left of its neutral position as shown.

When valve 37 is moved to the left in response to energization of winding 41 by way of leads 42 and 43, pressure in line 36 is applied by valve 37 to line 39 and thence to the head side of piston 34 to move platen 14 and die 18 toward pressure vessel 22 to close the same, the oil on the rod side of the piston returning by way of line 38 and valve 37 to line 40. Energization of winding 44 by way of leads 45 and 46 moves valve 37 to a position to the right of the neutral position shown to thus apply pressure through valve 37 to line 38 and thence to the rod side of piston 34 to move die 18 away from pressure vessel 22, the oil on the head side of piston 34 returning by way of line 39, valve 37, and line 40. When valve 37 moves to the right of its neutral position as now being considered, a spring 29 is compressed which serves to restore the valve to its neutral position upon deenergization of winding 44.

The rams of cylinders 33 provide pressure of the order of up to 50,000 p.s.i. closing pressure and 200,000 p.s.i. locking pressure. A pressure switch 47 is connected for response to this pressure as by a line 48 to pressure line 39, and when the pressure develops to the desired level, switch 47 is actuated to connect the switch leads 49 and 50. Conversely, a loss of pressure in line 39 breaks the connection between leads 49 and 50 to perform a fail-safe function; hereinafter to be more fully described.

C-frame jaw surfaces 12 and 13 have central openings 51 and 52 respectively of which opening 51 serves to clear the hydraulic drive system for platen 14 and opening 52 serves to clear the semi-spherical portion 53 of pressure vessel 22. A spark gap transducer 54 is threadedly mounted in the base of vessel portion 53 and is adjustably extendable into the cavity 23 of the pressure vessel. The transducer gap electrodes are connected by way of coaxial cable conductors 55 and 56 to the capacitor bank which, as aforementioned, is mounted in power cabinet 25 of FIG. 1. (See gap 54', FIG. 6a.)

Cavities 19 and 23, when the die 18 and pressure vessel 22 are closed, are separated and sealed from each other by the metal blank which is to be formed by shock waves set up in a body of electrically conductive water to be enclosed within the cavity 23. To this end, a pump 57 draws water via line 58 from a source (not shown) and passes the water under pressure through a line 59, a solenoid actuated valve 60, and thence by way of line 61 into cavity 23 at a low point therein. Valve 60 is opened, for the purpose, when its winding 62 is energized by way of leads 63 and 64. Alternatively, where adequate water pressure is available directly to the line 59, pump 57 is not required.

As the water rises to fill cavity 23, it forces all air, and eventually a small stream of water, outwardly of the cavity through the line 65 which leaves the cavity at a high point therein. When electrical energy is discharged from the capacitor bank across the water gap between the transducer electrodes, the generated shock waves are applied to the metal blank to force the same against the surface of die cavity 19 to thus form the part. Some shock wave pressure is applied to the water in the region of over-flow line 65, but due to this being a restricted opening, and due to the fact that the shock wave phenomenon does not involve a water displacement function, there is no appreciable loss of either water pressure or water as a result of the continued flow through line 65.

Die chamber 19 is evacuated by way of line 66 which connects to a solenoid actuated valve 67 which, in turn, is connected by way of line 68 to a vacuum pump 69. Valve 67 is opened, for this purpose, when its winding 70 is energized by way of leads 71 and 72.

The hydraulic actuator system and its associated equipment including pressure switch 47 conveniently are housed in the lower left end portion of C-frame 10 as viewed in FIG. 1, and the vacuum and water systems and their associated equipment conveniently are housed in the lower right end of the C-frame. Transducer 54, of course, occupies the upper right end portion of the C-frame with ample clearance being provided all around in view of the high voltage current carried by the transducer and its coaxial cable and the need to avoid and minimize stray capacitive and inductive effects.

Figure 6:
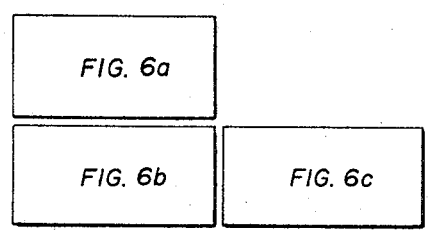
FIG. 6 is a diagrammatic showing of the suggested arrangement of the sheets depicting circuit FIGS. 6a to 6c in order best to show the charge and discharge control circuit in its entirety.
Figure 6A:
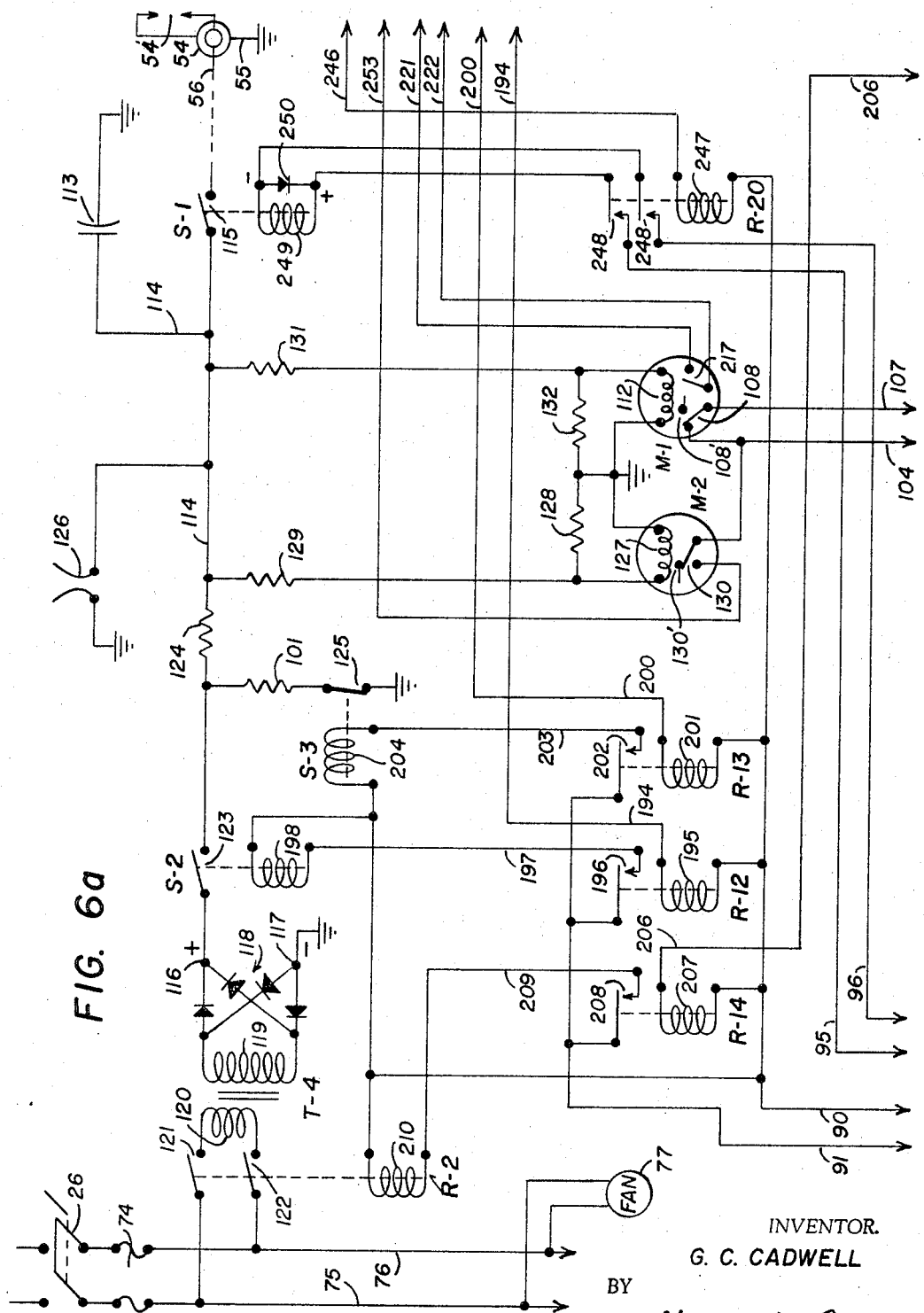
Figure 7:
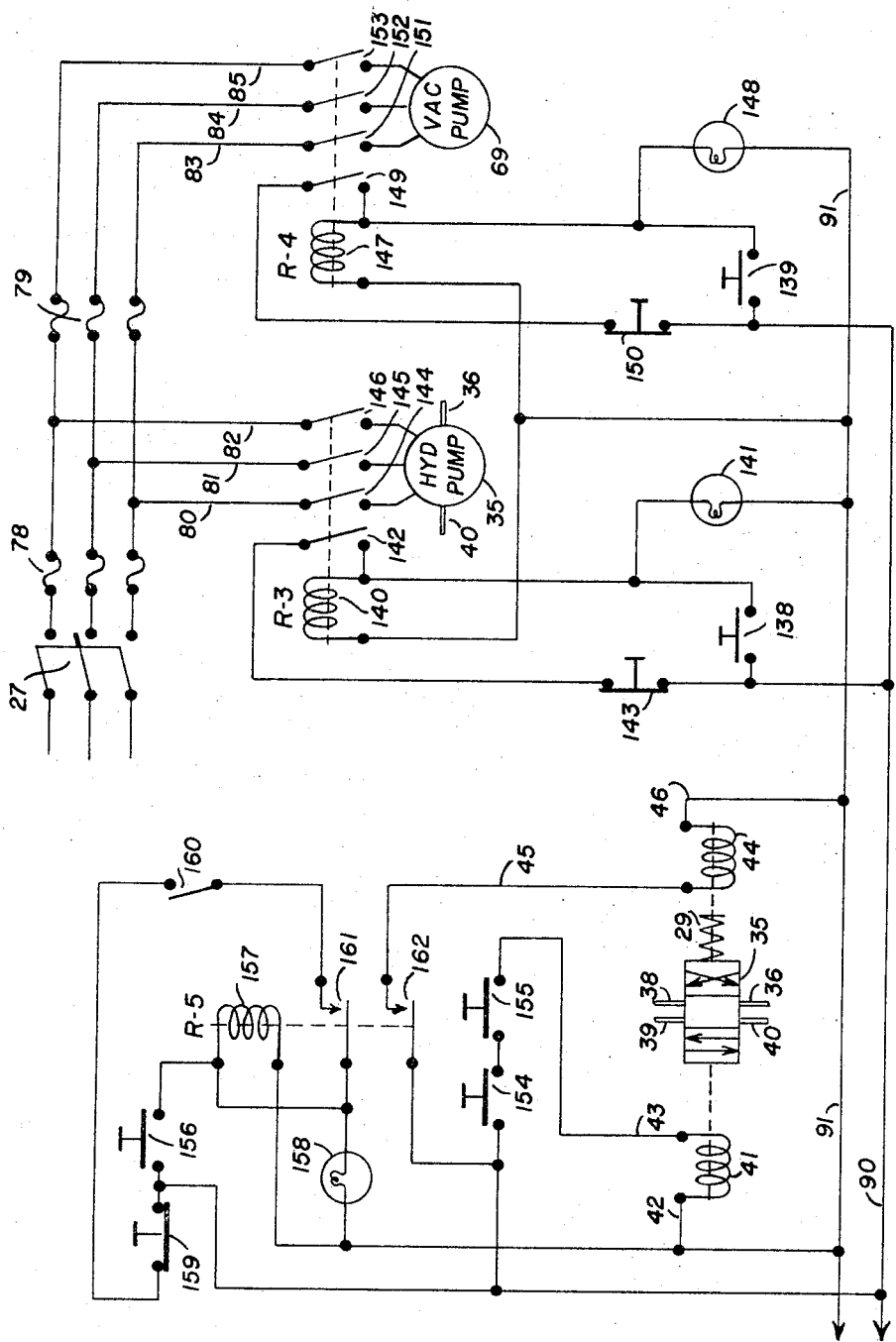
FIG. 7 is a diagrammatic view showing the control circuits for the hydraulic and vacuum systems.

In the operation of the apparatus as thus far described, to form a part such, for example, as a semi-spherical shell on die 18 from the metal blank shown in FIG. 4, reference is now made additionally to FIGS. 5 to 12. Switch 26, FIGS. 1 and 6a, is first manually closed to supply a suitable industrial potential which may be of the order of 110 to 660 volts A.C. by way of fuses 74 to power lines 75 and 76 to thus turn on an equipment cooling fan 77 which is connected across this line. Switch 27, FIGS. 1 and 7, is next manually closed to supply potential of the order of 440 volts, 3 phase, for operating the vacuum and hydraulic systems, this power being applied by way of fuses 78 and 79 to hydraulic and vacuum pump lines 80 to 82 and 83 to 85 respectively.

Figure 5:
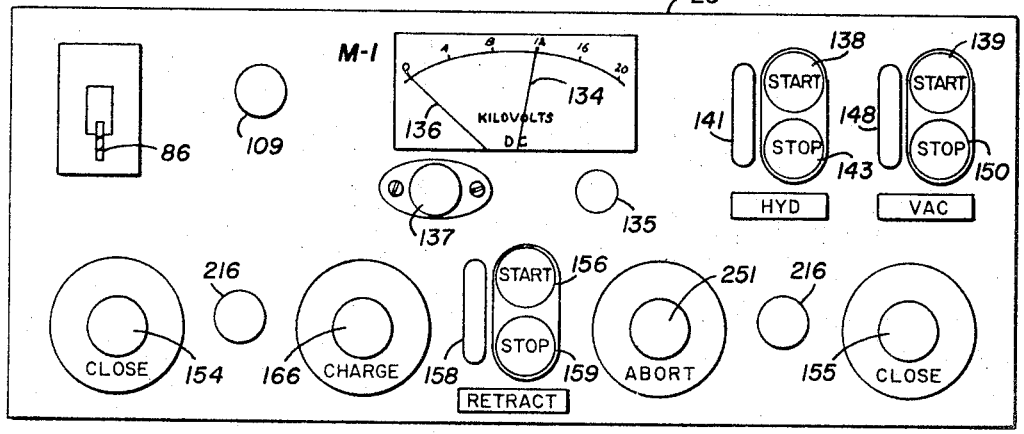
FIG. 5 is a plan view of the control panel.
Figure 6B:
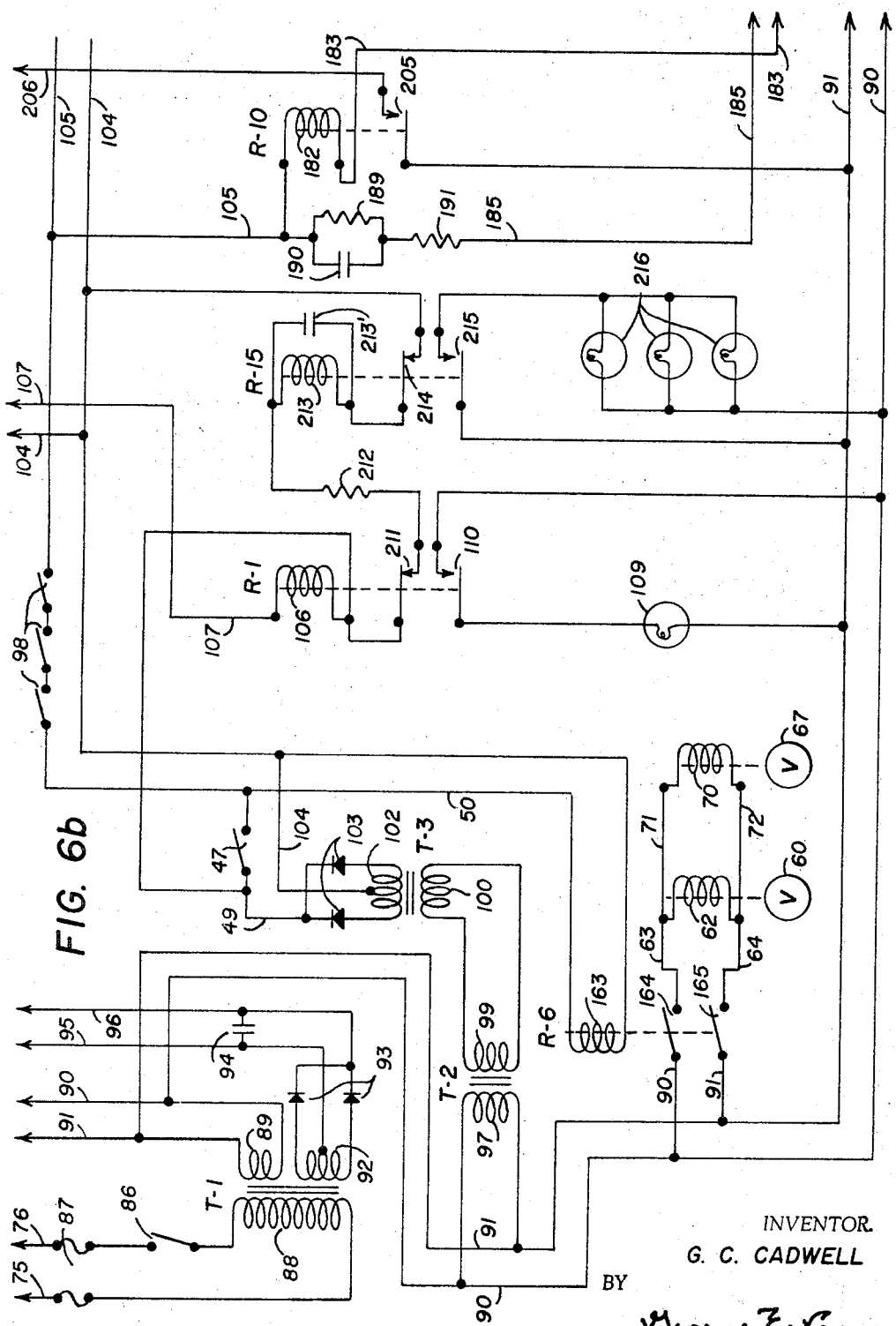

A key switch 86 located on panel 28 of panel unit 24, FIGS. 1, 5 and 6b, is next closed to apply the applicable industrial potential such as 220 volts A.C. on lines 75, 76, FIGS. 6a and b, by way of fuses 87 and switch 86 to the primary 88 of a transformer T–1 whose secondary 89 supplies a suitable potential such as 115 volts A.C. on lines 90 and 91, and whose secondary 92 by way of full wave rectifiers 93 and capacitor 94 supplies a suitable potential such as 28 volts D.C. unregulated on lines 95 and 96, FIGS. 6a and b.

The primary 97 of a transformer T–2 is connected across the 115 volt lines 90, 91, and its secondary 99 provides a suitable potential such as 110 volts A.C. controlled. Secondary 99 is connected across the primary 100 of a step down transformer T–3 whose secondary 102 and full wave rectifiers 103 supply a suitable potential such as 28 volts D.C. regulated on lines 49 and 104, transformer T–3 being designed in a well known manner to provide the regulation per se.

With voltage thus established on lines 49 and 104, relay R–1 is energized from positive potential on line 49, by way of winding 106 of relay R–1, and thence by way of conductor 107 (FIGS. 6a and b) and normally closed contacts 108 of a meter relay M–1, FIG. 6a, back to negative potential on line 104, FIGS. 6a and b. Upon energization of relay R–1, FIG. 6b, a circuit is completed thereby for lighting a green lamp 109, see also FIG. 5, from potential on line 90 and closed contacts 110 of relay R–1, and thence by way of lamp 109 to potential on line 91. Lighting of lamp 109 indicates that control power is now available and that the capacitor bank either has no stored energy or a safe voltage level of energy for reasons which will presently appear.

Referring again to FIG. 6a, meter relay M–1 is a commercially available type such, for example, as API#160Z–L manufactured by Associated Products, Inc. The meter relay has a moving coil 112 which is connected so as to respond to the voltage developed on the capacitor bank which is exemplified for the sake of simplicity by the single capacitor 113. One side of capacitor 113 is grounded and the other side is connected by a conductor 114 and the normally open contacts 115 of an energy transfer switch S–1 to transducer 54 by way of its coaxial cable conductor 56, the other side of the transducer being grounded by its coaxial cable conductor 55.

Capacitor 113 receives its charge from a high voltage D.C. power source having output terminals 116–117 and comprising a full wave diode rectifier network 118 connected across the secondary 119 of a transformer T–4. The primary 120 of the transformer is connected across power lines 75, 76 by the normally open contacts 121 and 122 of a charge relay R–2. The negative terminal 117 of rectifier network 118 is grounded and the positive terminal 116 is connected by way of the normally open contacts 123 of an energy isolation switch S–2 to a resistor 124 connected to capacitor line 114. To insure that no charge remains on the capacitor bank 113 following transfer of energy to transducer 54 by way of switch S–1, a grounding switch S–3 is provided whose normally closed switch contacts 125 are connected between ground and by way of a current reducing resistor 101 to the junction between resistor 124 and contacts 123 of switch S–2. In order to avoid possible damage to the rectifiers of network 118 as a result of a back surge of energy upon discharge of capacitor bank 113 through switch S–1, a surge arrestor in the form of an energy grounding gap 126 is connected between ground and capacitor line 114 and spaced so as to pass any energy whose voltage level exceeds the safe back voltage capacity of the diode rectifiers.

A second meter relay M–2 which is API type No. 355–C and is generally similar to meter relay M–1 has a moving coil 127 which is connected between ground and the midpoint of a voltage divider network comprising resistors 128 and 129. Resistor 128 is grounded and resistor 129 is connected to capacitor line 114 with the result that meter M–2 responds to the voltage developed across resistor 128 which is proportional to the voltage developed on capacitor bank 113. As will appear subsequently, normally open contacts 130 of meter relay M–2 are set to close when the voltage level exceeds the rated maximum working voltage of the herein-disclosed electric discharge machine.

A voltage divider network comprising resistors 131 and 132 is connected between capacitor supply conductor 114 and ground, and the moving coil 112 of meter M–1 is connected across resistor 131 to thus respond to the voltage developed thereacross and proportionally to the voltage on capacitor bank 113 as the capacitor bank charges. Meter M–1 in addition to the aforementioned normally closed contacts 108, also comprises a normally open pair of contacts 217 and a photo electric system which is manually settable as by the adjustment knob 135, FIG. 5, to a preselected voltage indicated by the pointer 134, so that the normally closed contacts 108 open when the voltage on capacitor bank 113 exceeds about 100 volts and the normally open contacts 217 close when the pointer 136, which moves with the moving coil of the meter, reaches the setting of pointer 134. A removable cap 137, FIG. 5, provides access to an internal adjustment of meter M–1 to deviate from the 100 volts operating level when it is desired to have contacts 108 open at a higher or lower voltage, as the case may be. In any event, the fact that contacts 108 are closed and, consequently, relay R–1 is energized and green lamp 109 is lighted, indicates that the energy stored in bank 113, if any, has a safe voltage level of less than the assumed example of 100 volts.

In the next sequence of operations, the hydraulic pump and vacuum pump motors are turned on by pressing momentary start button switches 138 and 139 respectively (FIGS. 5 and 7). Referring particularly to FIG. 7, closing switch 138 applies potential from line 90, 91 (FIGS. 6b and 7) across winding 140 of relay R–3 in parallel with white lamp 141 which then lights up on panel 28 (FIG. 5). Upon energization of winding 140, relay contact 142 closes to provide a lock-in circuit for winding 140 and lamp 141, the circuit then being completed by way of closed contacts 142 in series with normally closed momentary press stop button 143, and thence back to potential on line 90. Relay R–3 contacts 144 to 146 also close to apply power from lines 80 to 82 to the electric motor for hydraulic pump 35 to thus set the same in operation. Operation of the hydraulic motor may be stopped, however, at any time, by depressing stop button switch 143, FIGS. 5 and 7, to thus, interrupt the aforementioned lock-in circuit for relay R–3.

Vacuum start switch 139, see FIGS. 5 and 7, is now closed and this applies potential from lines 90, 91 across winding 147 of relay R–4 in parallel with white lamp 148 which then lights up on panel 28. Upon energization of winding 147, its contacts 149 close to provide a lock-in circuit for the lamp and relay, the circuit now being completed by way of closed contacts 149 in series with the normally closed momentary press stop button switch 150, and back to potential on line 90. Relay contacts 151 to 153 also close to apply power from line 83–84–85 to the electric motor for vacuum pump 69 to thus set the same in operation. Operation of the vacuum motor may be stopped, however, at any time by depressing stop button switch 150, FIGS. 5 and 7, to thus interrupt the lock-in circuit for relay R–4.

In the next sequence of operations, knob 135, FIG. 5 is adjusted to set pointer 134 at a desired operating voltage level, and the metal blank to be formed into die cavity 19 is positioned against the open face 18' of die 18. Both close button switches 154 and 155, FIGS. 5 and 7, are now depressed to actuate platen 14 to close die 18 against pressure vessel 22 with the part blank thus clamped and sealed between the confronting surfaces 18' 22'. Two button switches 154 and 155, serially connected and widely spaced on panel 28, are employed so as to require both hands of the operator to effect enegization of solenoid winding 41, FIGS. 4 and 7 and thus initiate closing of the die and pressure vessel structures as aforedescribed. With both hands thus occupied, there is no danger of the operator having his hande where the same might be injured by closing of these structures. Closing of the serially connected switches 154 and 155, FIG. 7, applies potential on line conductor 90 through the switches to winding lead 43 and thence through winding 41 and its lead 42 to potential on line conductor 91, to thus energize the winding.

When the part has been formed, or should it be desired to open the dies at any time before the forming operation has been completed, retract start button switch 156, FIGS. 5 and 7, is depressed to energize winding 157 of relay R–5 in parallel with white indicator light 158 from power on lines 90 and 91. Upon being energized, a lock-in circuit for relay R–5 and lamp 158 is completed from power on line 90 through the normally closed stop button switch 159, FIGS. 5 and 7, and thence through a microswitch 160 (closed at this time) and relay contacts 161 to relay winding 157 and lamp 158 which are connected on their other terminals to power on line 91. As relay contacts 162 close, power on line 90 is applied thereby and through winding lead 45 to solenoid winding 44 which is connected by its other lead 46 to power on line 91, thereby to energize winding 44 and open die 18, as aforedescribed.

Microswitch 160 is so positioned as to be closed by the platen 14 or any part which moves in association therewith as the platen moves to close die 18. Thus, the lock-in circuit for relay R–5 is interrupted when the platen has been moved to fully open the die. Opening movement of the die in any intermediate position, however, may be stopped by depressing button switch 159 which obviously de-energizes relay R–5 to thus de-energize winding 44. Upon de-energization of winding 44, valve 37 returns to its neutral position under power of spring 29, FIGS. 4 and 7, and thus further movement of the platen 14 is stopped. It will be understood, moreover, that when valve 37 is in its neutral position or in its position to right of neutral, as viewed in FIGS. 4 and 7, pressure on switch 47 (FIGS. 4 and 6b), is reduced so as to open the switch.

When winding 41 is energized, as aforedescribed, by depressing close button switches 154 and 155, valve 37 moves to the left and holds this position even after the winding 41 is de-energized by release of one or both of switches 154 and 155. This assures that die 18 is closed and remains closed and that pressure switch 47 likewise is closed. Upon closing of switch 47, refer now to FIG. 6b, potential is applied thereby from line 49 to conductor 50 and thence to winding 163 of relay R–6 connected on its other side to power line 104, thereby to energize the relay from the line 49, 104. As relay contacts 164 and 165 close, solenoid windings 62 and 70 for respectively actuating water and vacuum valves 60 and 67, FIGS. 4 and 6b, are energized in parallel from power on lines 90 and 91, thereby to actuate the valves to flood cavity 23 with water and evacuate the air from cavity 19, as aforedescribed.

As pressure switch 47 closes, positive potential on line 49 is also applied thereby and via conductor 50 through a series of door interlock switches 98 to conductor 105. Switches 98 are located on access doors to capacitor power cabinet 25, FIG. 1, to insure that the capacitor bank will not be charged when any of these doors is open. The interlock switches, as otherwise expressed, are connected in series circuit with the charge button switch 166, FIGS. 5 and 6c, for initiating the charging and firing cycle of the energy bank 113 and, hence, this cycle cannot be started if any one of the interlock switches is open.

Charge button switch 166, FIGS. 5 and 6c is now depressed to initiate the charging and firing cycle of capacitor bank 113, FIG. 6a. Referring particularly to FIG. 6c, as switch 166 is closed momentarily, a circuit is completed for energizing relay R–7 from positive potential on conductor 105 through relay winding 167, conductor 168, and normally closed contacts 169 of relay R–8, and thence by way of conductor 170 and switch 166 to negative power line 104. FIGS. 6b and c. As relay R–7 operates its contacts 171 close to shunt switch 166 to thus establish a lock-in circuit, as just traced, to maintain energization of relay R–7 until relay R–8, FIG. 6c, operates to open its normally closed contacts 169.

An RC network in the form of a series-parallel arrangement, namely, resistor 172 connected in series with the parallel combination of resistor 173 and capacitor 174, is connested across winding 167 of relay R–7 and has the well known effect of delaying both the operation and release of the relay following energization and de-energization respectively of its winding.

As contacts 175 of relay R–7 close, a circuit is completed for energizing relay R–9 from positive potential on conductor 105 through winding 176 of relay R–9, conductor 177, contacts 175 of relay R–7, and thence by way of resistor 178 to negative potential on power line 104. The series connected RC network 179, 180 is connected across relay winding 176 and together with resistor 178 provide, in a well known manner, a delay operate time for relay R–9. Upon release of the relay, following de-energization of its winding 176, resistor 179 alone determines the slow release time of the relay, the discharge network for the capacitor 180 being the winding 176 and resistor 179 in series circuit therewith. In other words, by reason of the arrangement described, relay R–9 has a slower operate than release time.

As relay R–9 operates, its contacts 181 close to complete a circuit for energizing relay R–10, FIG. 6b, from positive potential on conductor 105 through winding 182 of relay R–10, conductor 183, FIGS. 6b and c, normally closed contacts 184, FIG. 6c, of relay R–8, conductor 185, normally closed contacts 186 of relay R–16, and conductor 187 to now closed contacts 181 of relay R–9, and thence by way of resistor 188 to negative potential on power line 104. Referring again to FIG. 6b, a series-parallel RC network comprising resistor 189, capacitor 190, and resistor 191 is connected across winding 182 of relay R–10, the parallel network 189, 190 being connected to conductor 105 on one side of winding 182 and by way of resistor 191, conductor 185, FIGS. 6b and c, normally closed contacts 184 of relay R–8, FIG. 6c, and conductor 183 back to the other side of winding 182 of relay R–10, FIG. 6b. By reason of this circuit arrangement, resistance 188 FIG. 6c, is in the charging unit for capacitor 190, FIG. 6b, upon energization of winding 182, to thus give relay R–10 a longer slow operate time than the slow release time provided by the series-parallel network 189, 190, and 191. Relay R–10, moreover, when relay R–8 is operated to open its contacts 184, disconnects the RC network 189–191 from winding 182 of relay R–10 to release the relay instantly upon de-energization of its winding.

In the circuit operation thus far described following closing of charge button switch 166, relay R–7 has operated and, in turn, has operated relay R–9 which, in turn, has operated R–10. These relays, in the same sequence, operate relays R–12, R–13, and R–14 of FIG. 6a, as will presently be described. Referring first to FIG. 6c, as relay R–7 operated, its contacts 193, FIG. 6c, closed to complete a circuit from power on line 91, through these contacts and conductor 194, FIGS. 6a, 6c, to winding 195 of relay R–12, FIG. 6a, which winding is connected on its other side to potential on power line 90, thereby to energize relay R–12. As relay R–12 operates, its contacts 196 close to complete a circuit for energizing switch S-2 from power on line 91, through contacts 196 of relay R-12 and conductor 197 to winding 198 of switch S-2, and thence through the winding to power on line 90. As switch S-2 operates, it contacts 123 close to connect the positive terminal 116 of the high voltage rectifier network 118 by way of resistor 124 and conductor 114 to capacitor bank 113 preparatory to charging the same from the high voltage power source.

As relay R-9, FIG. 6c, operated, its contacts 199 closed to complete a circuit from power on line 91, through these contacts and conductor 200, FIGS. 6a and c, and thence to winding 201 of relay R-13, FIG. 6a, which winding is connected on its other side to potential on power line 90, thereby to energize relay R-13. As relay R-13 operates, its contacts 202 close to complete a circuit for energizing switch S-3 from potential on power line 91, through contacts 202 of relay R-13 and conductor 203 to winding 204 of switch S-3, and thence through the winding to potential on power line 90. As switch S-3 operates, its normally closed contacts 125 open to remove the shorting to ground otherwise afforded thereby for the capacitor bank 113.

As relay R-10, FIG. 6b, operated, its contacts 205 closed to complete a circuit from potential on power line 91, through these contacts and conductor 206, FIGS. 6a and b, and thence to winding 207 of relay R-14, FIG. 6a, which winding is connected on its other side to potential on power line 90, thereby to energize relay R-14. As relay R-14 operates, its contacts 208 close to complete a circuit for energizing relay R-2 from potential on power line 91, through contacts 208 of relay R-14 and conductor 209 to winding 210 of relay R-2, and thence through the winding to potential on power line 90. As relay R-2 operates, its contacts 121 and 122 close to energize transformer T-4 from power line 75, 76, thereby to initiate charging of the capacitor bank 113.

As the charge on capacitor bank 113 builds up, meter relays M-1 and M-2 follow this build up, and when the voltage level reaches about 100 volts contacts 108 of meter M-1 open to disrupt the circuit, previously traced through contacts 108, for energizing winding 106 of relay R-1, whereupon the relay is released and its contacts 110 open to put out green light 109. Its contacts 211, however, close to complete a circuit for energizing relay R-15 from positive potential on line 49 through contacts 211 of relay R-1 and resistor 212 to winding 213 of relay R-15 shunted by capacitor 213', and thence through the winding and normally closed contacts 214 of relay R-15 to negative potential on power line 104. Relay 15 is somewhat delayed in operation due to the RC network comprising resistor 212 and capacitor 213' and, when operated, its contacts 215 close to connect a bank of red warning lamps 216 across power line 90, 91, thereby to light these lamps. This circuit for operating relay R-15, however, is immediately interrupted by its own contacts 214 which open as the relay operates. The relay does not release immediately, however, due to its energization being continued momentarily by the charge on capacitor 213'. The result of this arrangement is that relay R-15 is operated repetitively by a series of self-generated pulses to thus cause flashing of the red lamps 216. Two of the flashing warning lamps are located on the panel 28, FIG. 5, and the third one is located on the door (not shown) to cabinet 25. The flashing lights thus indicate that a high voltage level is being developed on the capacitor bank 113.

When the voltage reaches the level set by pointer 134 on meter M-1, FIG. 5, the meter contacts 217, FIG. 6a, close to complete a circuit for energizing relay R-16, FIG. 6c, from positive potential on conductor 105 through winding 218 of relay R-16, conductor 219, normally closed contacts 220 of relay R-8 and conductor 221, FIGS. 6a and c, to contacts 217 of meter M-1, FIG. 6a, and thence by way of conductor 222, FIGS. 6a and c, and now closed contacts 223 of relay R-9 to negative potential on power line 104. As relay R-16 operates, its normally closed contacts 224 open to disrupt a circuit for charging capacitor 225 from positive potential on conductor 105 through resistor 226 and contacts 224 of relay R-16 to negative potential on power line 104. As contacts 227 of relay R-16 close, however, the charge on capacitor 225 is utilized to energize relay R-17, the circuit for this purpose being traced from capacitor 225, conductor 105, winding 228 of relay R-17, and thence by way of contacts 227 of relay R-16 and resistor 226 back to capacitor 225. The RC time constant of network 225, 226 in relation to the release voltage of relay R-17 determines the length of time that the relay will remain operated since its energizing circuit otherwise depends only upon continued closure of contacts 227 of relay R-16. In this respect, as relay R-17 operates, its contacts 229 close to provide a lock-in circuit for relay R-16 from positive potential on conductor 105 by way of winding 218 of relay R-16, conductor 219, and thence by way of contacts 229 to negative potential on line 104.

As relay R-17 operated, its contacts 230 closed to complete a circuit for energizing relay R-18 from positive potential on conductor 105, through winding 231 of relay R-18, contacts 230 of relay R-17, and thence by way of resistor 232 to negative potential on line 104. The operation of relay R-18 is delayed, however, by reason of the series RC network 233, 234 connected across winding 231 of the relay and the additional resistance 232 in the circuit. During the delay in operation of relay R-18 as thus provided, relays R-10 and R-7 are released in that sequence, thereby to release relay R-2 and switch S-2 in the same sequence so that the transformer T-4 is de-energized to stop further charge of the energy bank 113, and the rectifier network 118 is disconnected from the energy bank 113 to prevent damage thereto on discharge of the bank. How this release operation is accomplished will now be described.

As relay R-16 operated, its normally closed contacts 186 opened to thus interrupt the circuit previously traced through these contacts for energizing relay R-10 from power line 104, 105, and thus the relay is disconnected from power line 104 but energization of the relay from the charge in capacitor 190 continues for a period determined by the RC time constant of network 189-191 and the release voltage of the relay. Upon release of relay R-10, its contacts 205 open to de-energize and release relay R-14. Relay R-14, through its now opened contacts 208, de-energizes and releases relay R-2 and as relay R-2 releases, its contacts 121 and 122 open to de-energize transformer T-4 to thus stop further charge of the energy bank.

As relay R-16 operated, its contacts 235 closed to complete a circuit for energizing relay R-19, FIG. 6c, from positive potential on conductor 105, through winding 236 of relay R-19, conductor 253, and now closed contacts 235 of relay R-16 to negative potential on line 104. Relay R-19 operates instantly on energization, but its contacts 238 close as the relay operates to connect RC network 239, 240 across its winding 236 to thus cause relay R-19 to be slow to release when the before-traced circuit therethrough to power line 104 through contacts 235 of relay R-16 is broken as these contacts open upon release of relay R-16. Thus, relay R-19 is fast operate and slow release.

As relay R-19 operated, its contacts 241 closed to complete a circuit for energizing relay R-8 from positive potential on conductor 105 by way of winding 242 of relay R-8 and thence by way of now closed contacts 241 of relay R-19 to negative potential on line 104. As relay R-8 operates, its normally closed contacts 169 open, and the circuit previously traced therethrough for energizing relay R-7 from power on conductor 105 and line 104 is broken. Relay R-7, however, does not immediately release since the RC network comprising resistors 172, 173 and capacitor 174 maintains energization of the relay for a period of time determined by the time constant of the network and the release voltage of the relay. When relay R–7 releases, its contacts 193 open to de-energize and release relay R–12 whose contacts 196 then open to de-energize isolation switch S–2 to thus open its contacts and disconnect and isolate the rectifier network 118 from the capacitor bank 113 preparatory to discharging the same through switch S–1 to transducer 54.

Although contacts 175 of relay R–7, on closing, energized relay R–9, these same contacts on opening as relay R–7 releases, do not de-energize relay R–9 for the reason that these contacts are bridged by contacts 243 of relay R–17, the same being connected together on one side by conductor 177 and on the other side by conductor 244. Thus, when relay R–17 operated, its contacts 243 bridged contacts 175 of relay R–7 to provide a hold circuit for relay R–9.

As relay R–8 operated, its normally closed contacts 220 opened to thus break the circuit established thereby for energizing relay R–16 through contacts 217 of meter relay M–1 and contacts 223 of relay R–9. Operation of relay R–16, however, is maintained by contacts 229 of relay R–17, as aforedescribed. Opening of contacts 220 of relay R–8 insures that relay R–16 will release immediately when relay R–17 releases, it being recalled that the essential condition of release of relay R–17 is that since it maintains the energization of relay R–18 through its closed contacts 230, and since relay R–18 is slow operate by reason of its RC network 233, 234, R–17 must not release until after relay R–18 has operated, and relay R–18 must not operate until the charging of the energy bank has been stopped, as by opening contacts 121, 122 of relay R–2, and isolating the rectifier network 118 from the energy bank 113, as by opening contacts 123 of isolation switch S–2. This having been done, as aforedescribed, the circuit is ready for firing of the energy bank 113.

As relay R–18 operated, its contacts 245 closed to complete a circuit from power on line 91 by way of now closed contacts of relay 18 and thence by way of conductor 246, FIGS. 6a and c, to winding 247 of relay R–20, FIG. 6a, and thence through the winding to power on line 90, thereby to energize relay 20 from line 90, 91. As relay R–20 operates, its pair of contacts 248 close to connect winding 249 of firing switch S–1 across D.C. power line 95, 96, thereby to operate switch S–1 and close its contacts 115. Rectifier 250, connected across winding 249, insures that any back surge of energy due to the magnetic field associated with the discharge of energy through switch contacts 115 is short circuited.

As contacts 115 of firing switch S–1 close, the charge on capacitor bank 113 is discharged therethrough to transducer 54 and thence across the water gap between the transducer electrodes exposed to the water in pressure vessel 23 of FIG. 4, thereby to generate the shock waves for forming the metal blank.

When relay R–17 releases, its contacts 230 open to disconnect relay R–18 from power line 104, and after a delay occasioned by its RC network 233, 234, the relay is de-energized and released. Its contacts 245 then open to de-energize and release relay R–20. As contacts 248 of relay R–20 open, switch S–1 is de-energized and released to open its contacts 115, thereby to disconnect the transducer 54 from energy bank 113.

When relay 17 released, its contacts 243 also opened to thus break the circuit therethrough for continuing energization of relay R–9 from line 104 and conductor 105, winding 176 of the relay now being disconnected from line 104 as contacts 243 open. After a delay period occasioned by its RC network 179, 180, relay R–9 releases and opens its contacts 199 to thus de-energize and release relay R–13. As contacts 202 of relay R–13 open, grounding switch S–3 is de-energized and released to thus close contacts 125 of the switch. Any charge remaining on capacitor bank 113 is thus discharged to ground through resistors 124, 101 and contacts 125 of switch S–3.

When the voltage level on capacitor bank dropped below 100 volts, contacts 108 of meter relay M–1 again closed to again energize relay R–1 whereupon green lamp 109 is again lighted to indicate completion of the firing cycle. As relay R–1 operates, its contacts 211 again open to disconnect winding 213 of relay 15 from power on conductor 49 whereupon the self-interrupted pulses of relay 15 cease and flashing of red warning lights 216 stops to thus insure, by this visual indicator, that no lethal charge still remains on energy bank 113.

The charging and firing cycle having thus been completed, start button switch 156 is now depressed to open die 18, as aforedescribed, and the formed part is removed from die 18. If two or more discharges are required to fully form the metal blank, the die is not opened, but the charging and firing cycle is repeated as many times as required by again pressing the charge button switch 166 at the end of each cycle.

When the die is opened, of course, at the end of the firing cycle, the hydraulic pressure drops and pressure switch 47 (FIGS. 4 and 6b) opens to remove power on conductor 50 from line 49. Hence the vacuum and water to chambers 19 and 23, FIG. 4, are shut off preparatory to removing the formed part from die 18. If the hydraulic pressure fails at any time, moreover, the vacuum and water lines will thus be cut off.

Opening the pressure switch 47, or of interlock switches 98, also removes power from conductor 105. Thus, if the charging cycle has not yet been started, it cannot be initiated through charge button switch 166 if power has been removed from conductor 105, as aforementioned. If, on the other hand, the charging cycle has been started, relays R–7 to R–10 and R–16 to R–19 which depend on power on conductor 105 for their continued operation, are released when power is removed from conductor 105 as by loss of hydraulic pressure or opening of one of the cabinet access doors. These relays, upon release, are restored to their initial operating condition prior to the initiating of the charging cycle. Because of the time delays due to their RC networks, relays R–10, R–7, R–18 and R–9 release in the order named, and thus, relay R–2 (terminates charge of energy bank), switch S–2 (isolates energy bank), switch S–1 (fires energy bank), and S–3 (grounds or dumps energy bank) which are respectively controlled by relays R–10, R–7, R–18 and R–9, are also released in the same order.

An abort button switch 251, FIGS. 5 and 6c, is provided on panel 28 to enable the operator to dump any charge which has, or may have, developed on the capacitor bank 113 after the charging and discharging cycle has been initiated. Pressing button switch 251 has the effect of restoring the charging and firing control circuit to its initial operating condition, as will presently appear.

Referring now to FIG. 6c, it will be seen that capacitor 240 is charged to positive potential on conductor 105 by way of resistor 239 and normally closed contacts 252 of relay R–19 connected to negative potential on power line 104. When abort button switch 251 is depressed momentarily, winding 236 of relay R–19 is momentarily connected across line 104 and conductor 105 to energize the same and operate the relay with the result that the relay contacts 238 close to provide a lock-in circuit for energizing relay winding 236 from the charge on capacitor 240, the winding being connected to relay contacts 238 by conductor 253. Relay R–19 thus remains operated for a time determined by the time constant of RC network 239, 240 and the release voltage of the relay.

As relay R–19 operates, its contacts 241 close to energize and operate relay R–8 from conductor 105 and line 104, as aforedescribed. Assume first that abort button 251 had been pressed before the charge on the energy bank had built up sufficiently to cause closing of contacts 217 of meter relay M-1. In this event, when normally closed contacts 220 of relay R-8 open upon energization of the relay by operation of relay R-19, these now open contacts being connected in series with meter contacts 217 in the aforetraced circuit for initiating energization of relay R-16, would prevent such energization of relay R-16 and hence any further sequential operation of the firing control circuits, as aforedescribed, through relays R-16 to R-18.

Normally closed contacts 169 and 184 of relay R-8 also open as the relay operates to interupt the power line circuits maintaining the energization of relays R-7 and R-10. In the case of relay R-10, FIG. 6b, the winding 182 of this relay is de-energized by contacts 184 as the same open, and the relay is released without any time delay following de-energization thereof. Accordingly, further charging of the energy bank is terminated immediately on sequential release of relays R-14 and R-2. In the case of relay R-7, however, when contacts 169 of relay R-8 open, winding 167 of relay R-7 continues to be energized from its associated capacitor 174 and therefore does not release for some time delay following operation of relay R-8. When relay R-7 does release, it effects release of isolation switch S-2 to isolate rectifier network 118 from the energy bank. As relay R-7 releases, it also, in turn, effects release of relay R-9, and this relay, in turn, releases the grounding switch S-3 to thereby dump to ground any charge which may have accumulated on the energy bank. The operational sequence thus is: stop charge; isolate; and ground. Relay R-19, of course, releases when the charge on capacitor 240 falls below a voltage just sufficient to maintain continued operation of the relay. Upon release of relay R-19, relay R-8, in turn, is released to restore the control circuits to normal un-operated condition.

Assume now that the energy bank has been charged to its pre-set voltage level, but fails to fire due, for example, to malfunctioning of the firing switch S-1. In this case, relays R-10 and R-7 will have released as in a normal charging and firing cycle to stop the charge and isolate the high voltage source 116, 117 from the energy bank, but relay R-9 will not release to ground switch S-3 and thus dump the charge until contacts 243 of the relay R-17 open upon release of the relay as in a normal firing cycle. In this case discharge (firing) of the energy bank 113 occurs through the grounding switch instead of through the firing switch and the sequence of operations is the same as in abort, namely: stop charge, isolate, and dump.

Assume now that meter relay M-1, for example, malfunctions with the result that contacts 217 thereof fail to close and relay R-16 fails to operate and the charge builds up on capacitor bank to the level at which meter relay M-2 closes its contacts 130. In this case, contacts 130 on closing, shunt or bridge the abort contacts 251, contacts 130 being connected on one side to line 104 and on the other side by conductor 253, FIGS. 6a and c. As contacts 130 close, the operation is the same as when the abort button switch 251 is closed with the exception that contacts 130 stay closed until the over-charge has been dumped and relay M-2 is reset, as hereinafter described.

Briefly, the operation on over-charge again is that relays R-19 and R-8 close in rapid sequence. Relays R-10, R-14 and R-2 then release in rapid sequence to stop further charging of the energy bank. Relay R-7 releases after a short delay, to cause rapid release of relay R-12 and isolation switch S-2 to thus isolate the high voltage source 116, 117. Relay R-7, on release, also causes release of relay R-9 which, after a short time delay causes rapid release of relay R-13 and switch S-3 to thus ground the energy bank and dump the over-charge. The operation sequence on over-charge thus is: stop charge, isolate, and dump.

Figure 8:
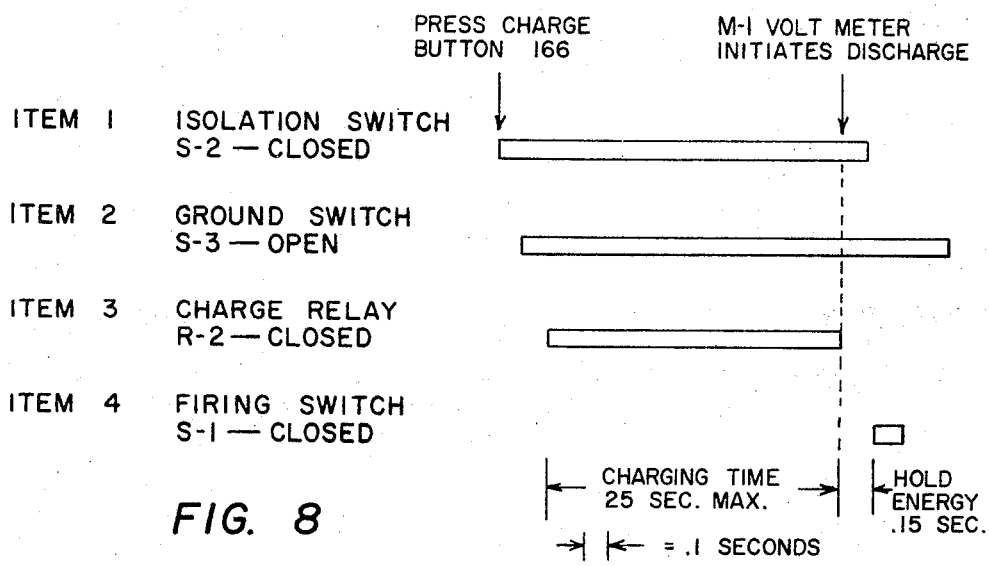
FIGS. 8 and 9 are diagrammatic views respectively depicting the normal firing and abort time sequence operations of the charge and discharge apparatus of the present invention.
Figure 9:
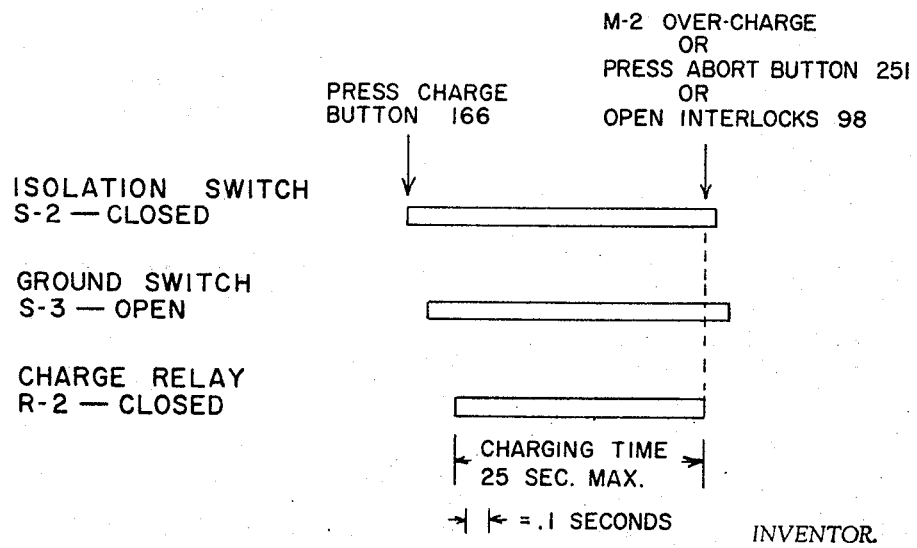

Referring now to FIGS. 8 and 9 wherein the aforedescribed firing and abort operations are depicted graphically, it will be seen, referring first to FIG. 8, that the press charge button 166 provides the starting reference and the voltmeter relay M-1 provides the terminal reference from which are timed the sequential operations of the isolation switch S-2, the ground switch S-3, the charge relay R-2, and the firing switch S-1. The time of operation of each switch or relay, as the case may be, is depicted by the rectangle associated therewith. Viewing these rectangles comparatively, and in relation to the starting and terminal references, it will be seen that the isolation switch S-2 closes first, followed after a short delay by opening of ground switch S-3, and this, in turn, followed after a short delay by closing of charge relay R-2, all in accordance with the normal charge and firing operations as heretofore described.

The charge begins with the closing of relay R-2 and may continue for a maximum of 25 seconds by depending on the voltage setting of meter relay M-1 which has been pre-selected and pre-set for firing the charge. As will more fully appear from the showing of FIG. 9, in the event that M-1 does not initiate a normal discharge through firing switch S-1, the charge will continue to increase for the full 25 seconds or more at which time and at which voltage level over-voltage meter relay M-2 will operate to dump the charge to ground.

When meter relay M-1 operates at the preset voltage level in a normal cycle of operations as depicted in FIG. 8, relay R-2 opens to terminate the charge, and after a short time delay of less than 0.15 second, isolation switch S-2 opens to protect the high voltage charging source. At the termination of the 0.15 second delay, firing switch S-1 closes to transfer the energy to the water gap between the electrodes of the transducer. It will thus be seen that the stored energy is held in a standoff condition by switch S-1 for a very short time delay sufficient only to insure that switch S-2 has opened to isolate the charging source from damage due to possible voltage back surge effects which may accompany the sudden release of stored energy on firing of the charge.

The firing switch S-1 remains closed for only a short interval, and after a short time delay, ground switch S-3 closes to thus complete the charge and discharge cycle of a normal firing operation.

Referring now to FIG. 9, it will be seen that the abort operations of isolation and ground switches S-2 and S-3 and charge relay R-2 are timed, as in FIG. 8, in relation to the start reference provided by charge button 166. For abort operations, however, the terminal reference is provided by over-charge meter relay M-2, or by the press abort button 251, or by any one of interlock switches 98.

Thus, charge relay R-2 is opened substantially instantly to terminate the charge upon pressing the abort button 251, or upon closing of contacts 130 of over-voltage meter M-2. This instantaneous termination of the charge occurs because these abort operations of button 251 and relay M-2 cause relays R-19 and R-8 to be sequentially operated without delay. Relay R-8, in turn, disconnects relay R-10 from its RC network with the result that relays R-10, R-14, and R-2 are released instantly in the order named to terminate the charge. Termination of the charge short of the pre-set level, of course, prevents sequential operation of relays M-1, R-16, and R-17, and R-18 and thus prevents operation of the firing switch S-1 which, it will be noted, is not depicted in FIG. 9.

Relay 8, on abort, in addition to releasing relay R-10 instantly cuts line power from relay R-7 so that its continued operation for a short interval depends upon its RC network. Relay R-7, on release, causes isolation switch S-2 to be opened and cuts line power from relay R-9 so that its continued operation for a short interval depends upon its RC network. On release, relay R-9 causes grounding switch S-3 to be closed. The time delayed sequential closing of switches S-2 and S-3 following the abort operation of either button 251 or relay M-2 is depicted graphically in FIG. 9 in relation to the terminal reference.

In the case of abort by interlock or pressure failure, line power via conductor 105 is removed from all of control relays R-7, R-8, R-9, R-10, R-16, R-18 and R-19, and upon instantaneous release of relay R-16, which has no time delay RC network to continue its operation, it disconnects relay R-17 from its RC network so that relay R-17 also releases instantly. When this abort operation occurs before the pre-set charge level is reached, control relays R-7, R-9 and R-10 alone are left operated by virtue of their time delay RC networks, and the order of release of these relays, which is as depicted in FIG. 9, depends upon the timing afforded by the respective networks.

When the abort due to interlock or pressure failure occurs concurrently with or after the charge is completed but prior to firing, relay R-10 will have been released by relay R-8 and relay R-7, which is also de-energized by relay R-8 in a normal charge operation, will either be continued in operation by its RC network or will already have been released by the network, thereby to isolate the charging source. Upon removal of line power from conductor 105, however, relay R-9 is placed at once in reliance upon its RC network for continued operation and does not need to await release of relay R-7 for such operation, as in a normal firing operation, or in the case of abort by actuation of abort button 251 or meter relay M-2. Upon its release, relay R-9 causes grounding of switch S-3 to dump the charge, but this now occurs shortly after the terminal abort reference as depicted in FIG. 9.

In each of the abort instances considered, the sequence of operation of switches S-2 and S-3 and relay R-2 following abort is as depicted in FIG. 9. From this sequence it may be seen that the isolation switch is open before the ground switch is closed to dump the charge, thereby to protect the high voltage rectifiers of the charging source, as before, from the possibility of back surge damage.

The firing switch S-1, isolation switch S-2, and ground switch S-3 are all vacuum switches, that is, solenoid actuated switches which mechanically close in a vacuum such, for example, as Jennings Radio Type No. RP6A which is used for switch S-1, type No. R2G-4201 which is used for switch S-2, and type No. R2G-4202 which is used for switch S-3.

Control relays R-1, R-7, R-8, R-9, R-10, R-16, R-17, R-18, and R-19 may be identical and of any type suitable for the purpose such, for example, as Advance Relay type GHP3C. The RC networks associated with these relays have given satisfactory timing results when the following values have been used.

| Resistor | Ohms | Capacitor | Microfarads |
|---|---|---|---|
| 101 | 12.0 | 174 | 250.0 |
| 124 | 5,500.0 | 180 | 250.0 |
| 128 | [1] 0.158 | 190 | 250.0 |
| 129 | [1] 40.0 | 213 | 250.0 |
| 131 | [1] 40.0 | 225 | 500.0 |
| 132 | [1] 0.125 | 234 | 500.0 |
| 172 | 10.0 | 240 | 750.0 |
| 173 | [1] 1,400.0 | | |
| 178 | 340.0 | | |
| 179 | 10.0 | | |
| 188 | 400.0 | | |
| 189 | 200.0 | | |
| 191 | 10.0 | | |
| 212 | 562.0 | | |
| 226 | 10.0 | | |
| 232 | 500.0 | | |
| 233 | 10.0 | | |
| 293 | 10.0 | | |

[1] Megohms.

Figure 11:
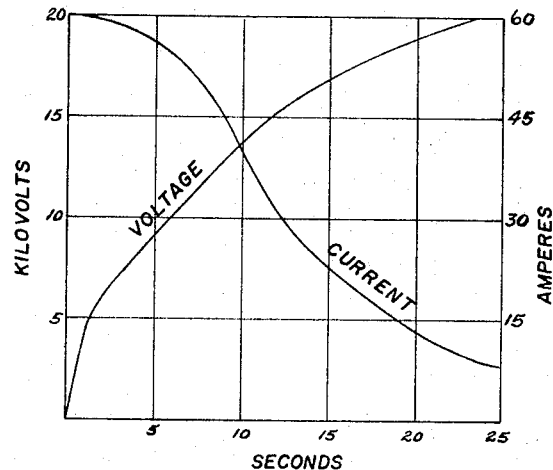
FIGS. 11 and 12 are graphs illustrating parametrical relationships characteristic of the operation of the apparatus of the present invention.
Figure 12:
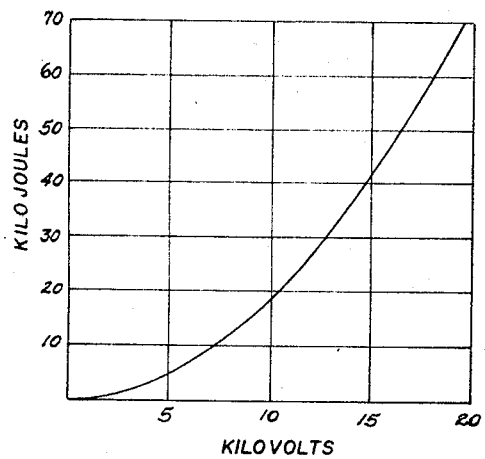

Parametrical characteristics of the charging source and circuit are disclosed graphically in FIGS. 11 and 12 and in relation to the energy bank 113 which for the values shown comprises a bank of 24 Cornell-Dublier capacitors, each rated at 15 microfarads, 20 kilovolts. Power supply transformer T-4 for charging the energy bank may be of any type suitable for the purpose such as D.C. Harder type No. 91455-T4 which is rated at 230 volts primary and 19,000 volts secondary and designed to have the primary current characteristic disclosed in FIG. 11 wherein the current decreases from 60 to 7.5 amperes as the charge on the capacitor bank increases from zero to 20 kilovolts within a period of 25 seconds. In this arrangement, the secondary charging current at upwards of 18,000 volts is limited to a maximum of 0.6 ampere, thereby to prolong the life of the capacitors in the energy bank as well as to protect the high voltage diode rectifiers 118 and the windings of transformer T-4 against excessive current flow. Diodes 118 may be of any type suitable for the purpose such, for example, as International Rectifier Corporation type IRC 66-5990.

The energy stored on capacitor bank 113 as a result of the voltage applied thereto as depicted in FIG. 11 is disclosed graphically in FIG. 12 wherein it will be seen that the energy stored at the level of 18 kilovolts, for example, is 60 kilojoules which may be taken as the rated capacity of the hereindisclosed electric discharge machine. Referring again to FIG. 11, it will be seen that the charging time for the rated voltage and energy level is 20 seconds.

Figure 10:
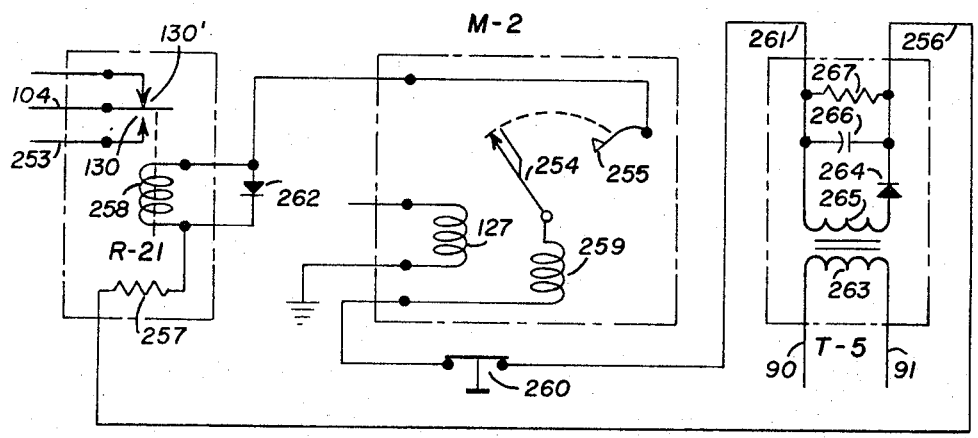
FIG. 10 is a diagrammatic view of the over-voltage meter switch and its associated control circuits.

Referring now to FIG. 10, the circuit for relay M-2 is disclosed as comprising a switch arm 254 which is moved by moving coil 127 to engage a fixed contact 255 when the voltage sensed by coil 127 is at the maximum safe charging voltage for the capacitor bank 113 of the hereindisclosed electric discharge apparatus. Contact 255 is adjustable so as to change the voltage at which contacts 254, 255 engage, when this is desired. When contacts 254, 255 engage, a circuit is completed for operating relay R-21 from positive D.C. potential on conductor 256 by way of voltage reducing resistor 257, winding 258 of relay R-21, contacts 254, 255, hold winding 259, and thence by way of push button reset switch 260 to negative potential on conductor 261. Winding 259, on being thus energized operates to hold arm 254 in engagement with contact 255. A rectifier 262 connected across relay winding 258 assures constant energization thereof from line 256, 261 notwithstanding erratic or non-positive initial closing of contacts 254, 255. As relay R-21 operates, its contacts 130 close to connect conductor 253 to line 104 as heretofore described. When it is desired to open spring contacts 130, reset button 260 is depressed to de-energize relay R-21 and thus release contact arm 254.

D.C. potential on lines 256, 261 is derived from transformer T-5 whose primary winding 263 is supplied from A.C. line 90, 91. A rectifier 264 provides half-wave rectification of the A.C. voltage on transformer secondary 265 and parallel connected capacitor 266 and resistor 267 provide a filtering and smoothing of the D.C. voltage thus provided.

Referring now to FIG. 13, there is disclosed thereon a motor-cam type circuit for accomplishing the desired sequential operation of the charge relay R-2 and the firing, isolate, and ground switches S-1 to S-3. A suitable potential is applied to the input lines 300, 301 for operating a motor 302 which may include a gear train, not shown, when this is required to provide the desired timing to be obtained from cams A to E which are driven by the motor output shaft as indicated schematically by the dashed line 303.

The charge and firing cycle provided by the motor-cam circuit of FIG. 13 is started by depressing the charge button switch 166 to complete a circuit from power line 300, 301 for energizing motor start relay R-22 by way of line 301, switch contacts 166, conductor 304, winding 305 of relay R-22, conductor 306, and thence by way of interlock switches 98 and pressure switch 47 to power line 300. As relay R-22 operates, its contacts 307 close to complete a circuit to motor 302 for energizing the same from line 300, 301 by way of line 300, pressure switch 47, interlock switches 98, conductor 306, motor 302, conductor 308, contacts 307 of relay R-22 and thence by way of conductor 309 and normally closed contacts 310 of sequencing relay R-23 to line 301.

As motor 302 operates, its cams A to E are rotated and its motor cam A first moves to force the cam follower 311 for switch 312 to move out of the dwell 313 in cam A and thus close switch 312. Switch 312 shunts push button start switch 166 to thus lock-in the circuit just previously traced for energizing the motor start relay R-22. This, in turn, of course, maintains the circuit just traced for operating the motor. Parallel switches 166 and 312 also energize a charge control relay R-24 from lines 300, 301, this circuit being traced from line 301, by way of switches 166 and 312 in parallel, conductor 304, winding 314 of charge control relay R-24, and conductor 315 to normally closed cam A contacts 316, and thence by way of contacts 316 to power on conductor 306 applied thereto by closed switches 98 and 47, whereupon relay 24 is energized and operates to open its normally closed contacts 330 and close its normally open contacts 340. As contacts 340 close an alternative path is completed from contacts 307 of relay R-22, by way of conductor 309, contacts 340 of relay R-24, conductor 304, and thence by way of motor cam A contacts 312 to power line 301.

As motor 302 continues to operate, its relay cam B next moves a riser portion 317 thereon to engage follower 318 of switch 319 so as to momentarily actuate the switch. As switch 319 closes, a circuit is completed for energizing cam sequencing relay R-23 from line 300, 301 by way of line 300, switches 47 and 98, conductor 306, cam B contacts 319, winding 320 of relay R-23, conductor 321, normally closed contacts 130' of meter relay M-2, normally closed abort switch 251', conductor 304, and thence by way of motor cam A contacts 312 to line 301, thereby to energize and operate cam sequencing relay R-23.

As relay R-23 operates, its cams $a$ to $f$, which are all secured to a common shaft depicted by the dashed line 322, are rotated as a unit against the biasing action of spring return 323. The dwells in cams $a$ to $f$ are progressively of greater length such that the respective followers for these cams are actuated thereby in successive order with the result that contacts 324 for cam $a$ are the first to close and contacts 328 on cam $f$ are the last to close as relay R-23 operates. Opening of cam $b$ contacts 310 thus follows closing of cam $a$ contacts 324 which shunt momentarily closed motor cam B contacts 319 to lock-in the circuit just traced for energizing relay R-23. Closing of contacts 325 to 328 for cams $c$ to $f$, moreover, then follows in successive order as the relay operates.

As cam $b$ contacts 310 of relay R-23 open, a previously traced path for maintaining energization of motor 302 is broken, but its parallel path traced through contacts 340 of relay R-24 in series with motor cam A contacts 312 maintains the circuit for operating motor 302.

Closing of cam $e$ contacts 327 at this time does not complete a circuit to relay R-2 for the reason that these contacts are connected by way of conductor 329 to normally closed contacts 330 of charge control relay R-24 which are open at this time, it being recalled that relay R-24 was energized by motor cam A contacts 312 as the same closed when the motor started to drive its cams A to E.

Upon further rotation of the motor cams A to E, the riser portion 331 of isolate cam D engages follower 332 for switch contacts 333 to thus close the same and complete a circuit for energizing and operating isolation switch S-2 from line 300, 301, this circuit being traced from power line 301, through winding 198 of isolation switch S-2, relay cam $d$ contacts 326, motor cam D contacts 333 to conductor 306, and thence by way of switches 98 and 47 to power line 300, whereupon switch S-2 operates to connect high voltage power source 116, 117 to energy bank 113.

Upon further rotation of motor cams A to E, riser portion 334 on motor cam C engages follower 335 for cam contacts 336 to close the same and complete a circuit for energizing and operating grounding switch S-3 from power line 300, 301, this circuit being traced from power line 301, winding 204 of grounding switch S-3, relay cam $c$ contacts 325, motor cam C contacts 336, conductor 306, and thence by way of switches 98 and 47 to power line 300, whereupon switch S-3 operates to open contacts 125 and remove the ground normally provided thereby for energy bank 113.

Upon further rotation of motor cams A to E, dwell 313 in motor cam A moves opposite follower 337 for cam A contacts. As follower 337 moves into dwell 313, cam A contacts 316 open to disrupt the circuit aforetraced therethrough for energizing charge control relay R-24, whereupon the relay is de-energized and released. As relay R-24 releases, its contacts 340 open to break the circuit, aforetraced, for continuing operation of motor 302, whereupon the motor stops. Contacts 330 of relay R-24 now close, however, to complete the circuit for energizing relay R-2, this being traced from power on line 301 by way of winding 210 of relay R-2, relay cam $e$ contacts 327, conductor 329, now closed contacts 330 of relay R-24 to conductor 306, and thence through switches 98 and 47 to power on line 300, whereupon relay R-2 is operated to energize transformer T-4 and start the charge of energy bank 113.

When the charge on bank 113 reaches the voltage set on meter relay M-1, its contacts 217 close to provide a third path from contacts 307 of relay R-22 via conductor 309 and contacts 217 to power line 301, whereupon motor 302 again operates to continue rotation of motor cams A to E. As the motor cams again rotate, dwell 313 in motor cam A moves follower 337 to again close cam A contacts 316 whereupon charge control relay R-24 is again operated to open its contacts 330. As contacts 330 open, the aforetraced circuit for energizing relay R-2 is interrupted, and charging of the energy bank stops.

As motor cams A to E continue to rotate, follower 332 moves off of riser 331 and cam D contacts 333 open to de-energize and release switch S-2, whereupon the high voltage energy source 116, 117 is disconnected and isolated from the energy bank 113.

On further rotation of motor cams A to E, riser 341 on motor cam E engages follower 342 on cam E contacts 343 to close the same and complete a circuit to control relay R-20 for operating firing switch S-1 from power on line 301 through winding 247 of relay R-20, relay cam $f$ contacts 328, motor cam E contacts 343 to conductor 306, and thence through switches 98 and 47 to power line 300, whereupon relay R-20 and firing switch S-1 are operated to discharge the energy from bank 113 through the transducer 54 and across the water gap between its electrodes 54' in shock generating chamber 19. As the charge on the energy bank is reduced, contacts 217 of meter relay M-1 open, and as cam follower 342 moves off riser 341 on cam E, contacts 343 open to release relay R-20 and switch S-1. Upon further rotation of motor cams A to E, follower 335 moves off riser 334 in motor cam C, whereupon contacts 336 open to release grounding switch S-3 to thus dump to ground any residual charge remaining on the energy bank 113. When motor cam A next moves to position its dwell 313 in operative relation to cam follower 311, cam A contacts 312 open to release charge control relay 24, cam sequence relay R-23, motor start relay R-22, and to stop motor 302, thereby completing the charging and firing cycle. Upon de-energization of relay R-23, its cams $a$ to $f$ are restored to initial position under power of spring return 323.

Normally closed switch 108 of meter relay M-1 is utilized in FIG. 13 to light green lamp 109 and opens, as before, when the voltage on the capacitor bank rises above 100 volts. When switch 108 opens, its companion switch 108' closes to light the red warning lamps 216.

In the event that switch 47 opens at any time because of loss of hydraulic pressure, or in the event that any of interlock switches 98 are opened, motor 302 stops immediately and all relays R–22 and R–24 are de-energized. All of switches S–1 to S–2 and relay R–2 likewise are de-energized to restore the circuit to initial operating condition except that motor cams A to E will be displaced from the initial position in which cam follower 311 is positioned in dwell 313 of cam A. Upon restoration of power to conductor 306, however, the motor control circuit to relay R–22 is completed through cam A contacts 312 to thus close contacts 307 of relay R–22. A circuit, as aforetraced, is then completed for operating motor 302 through contacts 307 of relay R–22 and relay cam $b$ contacts 300 to thus enable the motor to return the cams A to E to their initial positions.

In the event that normally closed abort button switch 251' is depressed at any time after the charging firing cycle is started, thereby to open that switch, or in the event that the energy bank is over-charged so that meter relay M–2 contacts 130' are opened, the circuit to sequencing relay R–23 is interrupted, it being recalled that its energizing circuit is traced through these series connected contacts. Therefore, when either of these contacts is opened, relay R–23 is released and likewise relay R–2 and switches S–1 to S–3 are released to thus prevent normal charging and firing of the energy bank. The motor 302, however, continues to operate to return its cams A to E to initial position.

From the foregoing, it should now be apparent that an electrical discharge method and apparatus for forming metals with exemplary embodiments and variations has been provided which is well adapted to fulfill the aforestated objects of the invention. It is to be understood, however, that the invention may be embodied in other forms or carried out in other ways without departing from the spirit or essential characteristics thereof. The embodiments of the invention heretofore disclosed, therefore, are to be considered as in all respects illustrative and not restrictive, the scope of the invention being indicated by the appended claims and all changes which come within the meaning and the range of equivalency of the claims are intended to be embraced therein.

Having thus described the invention, what is claimed as new and useful and desired to be secured by Letters Patent is:

1. A method of high velocity discharge of electrical energy at high voltage and energy levels comprising the steps of connecting the discharge circuit of a capacitor bank for discharge of its stored energy across and through a water gap in a body of electrically conductive water when a grounding circuit for the capacitor bank is opened and the discharge circuit is closed, closing the charging circuit of the capacitor bank and pre-setting the same to open when the charge on the bank has reached a predetermined level of voltage, opening said grounding circuit when the charging circuit is closed, energizing the charging circuit when the grounding circuit is opened to increase the voltage on the capacitor bank to said predetermined voltage level, closing the discharge circuit when the charging circuit opens, thereby to transfer the stored energy to the water gap, and closing the grounding circuit after the discharge circuit has closed to transfer any remaining charge to ground.

2. A method of high velocity discharge of electrical energy at high voltage and energy levels comprising the steps of connecting the discharge circuit of a capacitor bank for discharge of its stored energy across a water gap in a body of electrically conductive water when a discharge switch in the discharge circuit is closed and a grounding switch in a grounding circuit for the capacitor bank is opened, or selectively for discharge of the stored energy to ground when said grounding switch closes before the discharge switch closes, closing a charging switch in the charging circuit of the capacitor bank and pre-setting the same to open when the charge on the bank has reached a predetermined level of voltage, opening said grounding switch when the charging switch is closed, energizing the charging circuit when the grounding switch is opened thereby to increase the voltage on the capacitor bank to said predetermined level, closing said discharge switch when the charging switch opens thereby to transfer the stored energy to the water gap, and closing said grounding switch to transfer the stored energy to ground when the voltage level on the capacitor bank fails to reach or exceeds said predetermined level.

3. A method of high velocity discharge of electrical energy at high voltage and energy levels comprising the steps of connecting the discharge circuit of a capacitor bank for discharge of its stored energy across and through a water gap in a body of electrically conductive water when the discharge circuit is closed, pre-setting the charging circuit of said capacitor bank to open at a predetermined level of voltage on the bank, energizing the charging circuit to increase the voltage on the capacitor bank to said predetermined voltage level, closing the discharge circuit when the charging circuit opens, and closing said discharge circuit by a switch disposed within a vacuum and closed by the charging circuit as the same opens.

4. Apparatus for high velocity discharge of electrical energy at high voltage and energy levels comprising a normally discharged capacitor bank, a body of electrically conductive water, a pair of spaced electrodes disposed within said body of water and defining a water gap therewithin, a normally open switch disposed within a vacuum and interconnecting said bank and said gap within a discharge circuit for the bank, means for charging the bank, and means responsive to the rise in voltage on the bank as the same charges and operable at a pre-set voltage level to discontinue the charge and to close said discharge switch in the order named, thereby to transfer the energy in the bank to said gap for discharge thereacross, said voltage responsive means comprising a voltmeter relay having switch means operable at said pre-set voltage level, said switch means being operable to discontinue said charge and close said discharge switch.

5. Apparatus for high velocity discharge of electrical energy at high voltage and energy levels comprising a normally discharged capacitor bank, a body of electrically conductive water, a pair of spaced electrodes disposed within said body of water and defining a water gap therewithin, a normally open switch disposed within a vacuum and interconnecting said bank and said gap within a discharge circuit for the bank, means for charging the bank, means responsive to the rise in voltage on the bank as the same charges and operable at a pre-set voltage level to discontinue the charge and to close said discharge switch in the order named, thereby to transfer the energy in the bank to said gap for discharge thereacross, and a bank of indicator lamps, said voltage responsive means comprising a voltmeter relay having first and second switch means operable respectively at said pre-set voltage level and at a lower safe level, said first switch means being operable to discontinue said charge and close said discharge switch, certain of said indicator lamps being lighted by said second switch means before the voltage rises above said safe voltage level and certain other of said lamps being lighted by the second switch means when the voltage rises above the safe level.

6. Apparatus for high velocity discharge of electrical energy at high voltage and energy levels comprising a normally discharged capacitor bank, a normally closed ground switch for grounding the bank, a body of electrically conductive water, a pair of spaced electrodes disposed within said body of water and defining a water gap therewithin, a discharge circuit for the bank including a normally open discharge switch interconnecting said bank and said gap within said discharge circuit, a high voltage charging circuit for said bank including a high voltage power supply source and a normally open isolation switch disposed within said charging circuit to isolate the charging source from back surges in said discharge circuit, means including a normally open charge switch for energizing said power supply, and first circuit control means adapted to be set in operation by the operator for closing said isolation switch, opening said ground switch, and closing said charge switch in the order named, thereby to initiate charging of the bank, meter switch means including a switch and responsive to the rise in voltage on the bank as the same charges and operable at a pre-set and predetermined voltage level to close its switch, and second circuit control means operable by said meter switch as the same closes to open said charge switch, open said isolate switch, close said discharge switch to discharge the stored energy across said gap, and close said ground switch to discharge any remaining stored energy to ground, all in the order named.

7. Apparatus as in claim 6 and wherein said discharge switch, isolation switch, and ground switch are disposed each in a vacuum and each electrically actuated.

8. Apparatus as in claim 6 and wherein said first and second circuit control means comprise sequentially operated time delayed relays connected and arranged to complete a cycle of operations.

9. Apparatus as in claim 6 and wherein said first and second circuit control means comprises a cyclically operable multi-cam motor actuator adapted to be set in operation by the operator, close said isolation switch, open said ground switch, stop the motor, and close said charge switch all sequentially in the order named, and adapted to be again set in operation by the meter switch to stop the charge, open the isolation switch, close the discharge switch, close the ground switch, and stop the motor all sequentially in the order named to thus complete a cycle of operations.

10. Apparatus for forming metal by electric discharge comprising means forming an open ended cavity for receiving a body of electrically conductive water, said open end of the cavity being disposed within a vertical plane, a transducer mounted on said cavity forming means and having a pair of spaced electrodes defining an electric discharge gap within said cavity, die means movable into engagement with said cavity forming means and having a metal forming surface for engaging the part to close said open end of the cavity thereby and to expose the part in shock wave confronting relation to said discharge gaps, means for filling the closed cavity with a continuous flow of said water thereto and providing a restricted discharge of the water from the uppermost region of the cavity, a normally discharged capacitor bank, means for charging the bank, and means for discharging energy stored in the bank across and through said discharge gap to generate shock waves for forming the part against said die surface, said body of water being emptied by gravity from said open ended cavity when the formed part is removed from said die means.

11. Apparatus as in claim 10 and wherein said cavity has a restricted opening at its uppermost region for discharge of the water, and said water filling means provides continuous flow of water through said discharge opening thereby to remove all air bubbles from the water within the cavity.

12. Apparatus as in claim 10 and wherein said charging means comprises a charging control circuit for the capacitor bank, said die means comprises pressure means for moving the same into locking engagement with said cavity forming means, and said pressure means comprises a pressure responsive switch connected in said charging control circuit to close the same when the locking pressure has reached a predetermined value.

13. Apparatus as in claim 12 and wherein said water filling means comprises a solenoid actuatable valve for passing said water into the cavity when the valve is energized, and circuit means operable by said pressure switch as the same closes for energizing said solenoid actuable water valve.

14. Apparatus as in claim 12 and wherein said die means comprises means including a solenoid actuable valve for drawing a vacuum between the part and said metal forming surface when the valve is energized, and circuit means operable by said pressure switch as the same closes for energizing said solenoid actuable vacuum valve.

References Cited

UNITED STATES PATENTS

| | | | |
|---|---|---|---|
| 3,093,770 | 6/1963 | Wesley et al. | 315—241 |
| 3,364,708 | 1/1968 | Padberg | 72—56 |
| 2,931,947 | 4/1960 | Fruengel | 315—111 |
| 3,222,902 | 12/1965 | Brejcha et al. | 72—56 |
| 3,225,252 | 12/1965 | Schrom et al. | 315—111 |
| 3,232,085 | 2/1966 | Inoue | 72—56 |
| 3,232,086 | 2/1966 | Inoue | 72—56 |
| 3,234,429 | 2/1966 | Schrom | 315—111 |

RICHARD J. HERBST, *Primary Examiner.*

U.S. Cl. X.R.

315—111, 241